US012760585B2

(12) United States Patent
Houy

(10) Patent No.: US 12,760,585 B2
(45) Date of Patent: Oct. 13, 2026

(54) ANTI-OBSTRUCTION SYSTEM HAVING A RELEASE STOP WITH RELEASE LOCK

(71) Applicant: ASSA ABLOY Accessories and Door Controls Group, Inc., Monroe, NC (US)

(72) Inventor: Audomsoewanyque Houy, Memphis, TN (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 114 days.

(21) Appl. No.: 18/801,035

(22) Filed: Aug. 12, 2024

(65) Prior Publication Data

US 2025/0059819 A1 Feb. 20, 2025

Related U.S. Application Data

(60) Provisional application No. 63/533,533, filed on Aug. 18, 2023.

(51) Int. Cl.
*E06B 1/52* (2006.01)
*E05B 65/00* (2006.01)

(52) U.S. Cl.
CPC .............. *E06B 1/526* (2013.01); *E05B 65/00* (2013.01)

(58) Field of Classification Search
CPC ........ E05B 63/04; E05B 63/046; E05B 63/24; E05B 63/244; E05B 63/246; E05B 65/00; E05B 65/06; E05B 65/102; E05B 65/1026; E05B 65/1033
See application file for complete search history.

(56) References Cited

PUBLICATIONS

PEMKO (Year: 2020).*
ASSA ABLOY Accessories and Door Controls Group, Inc., Pemko Anti-Barricade Rescue Hardware, 2020, 24 pages.

* cited by examiner

*Primary Examiner* — Christine M Mills
*Assistant Examiner* — Yahya Sidka
(74) *Attorney, Agent, or Firm* — Moore & Van Allen PLLC; Jeffrey R. Gray

(57) ABSTRACT

An anti-obstruction system for improved safety in the event a barrier becomes obstructed by objects or a person. The anti-obstruction system utilizes a double swing hinge and an emergency release stop to act as the stop for the barrier so that the barrier can only swing in one direction. The release stop may have a support member (e.g., coupled to a frame) and a stop member coupled together through the use of a cover. The stop member stops the door from swinging in two directions when the release stop is engaged and allows the door to swing past the stop member when it is disengaged. The release stop may be engaged and disengaged through the use of a release lock that has one or more projections that restrict movement between the support member, the stop member, and/or the cover when engaged, and allows for movement when disengaged.

17 Claims, 34 Drawing Sheets

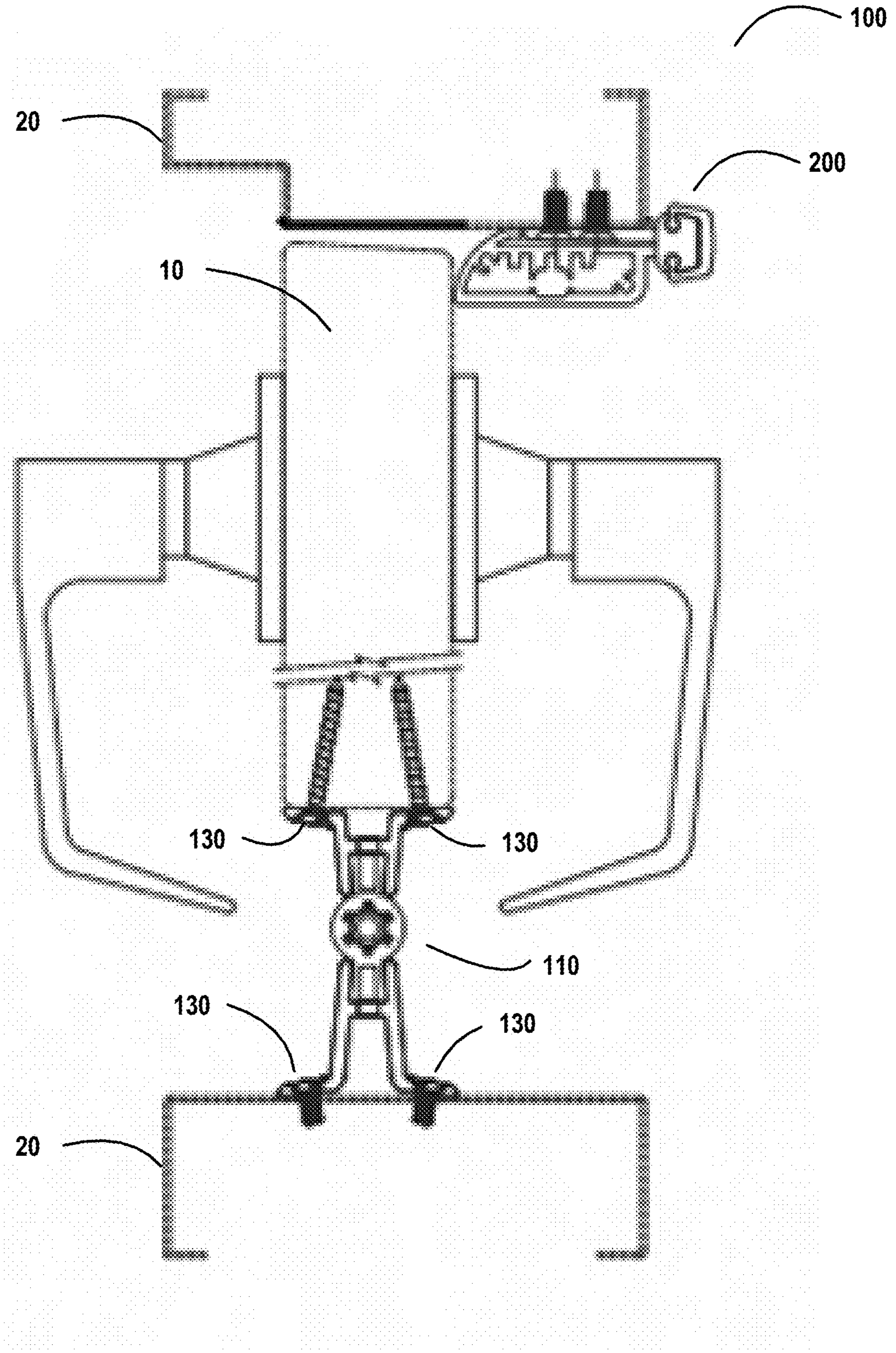
*FIG.* 3A

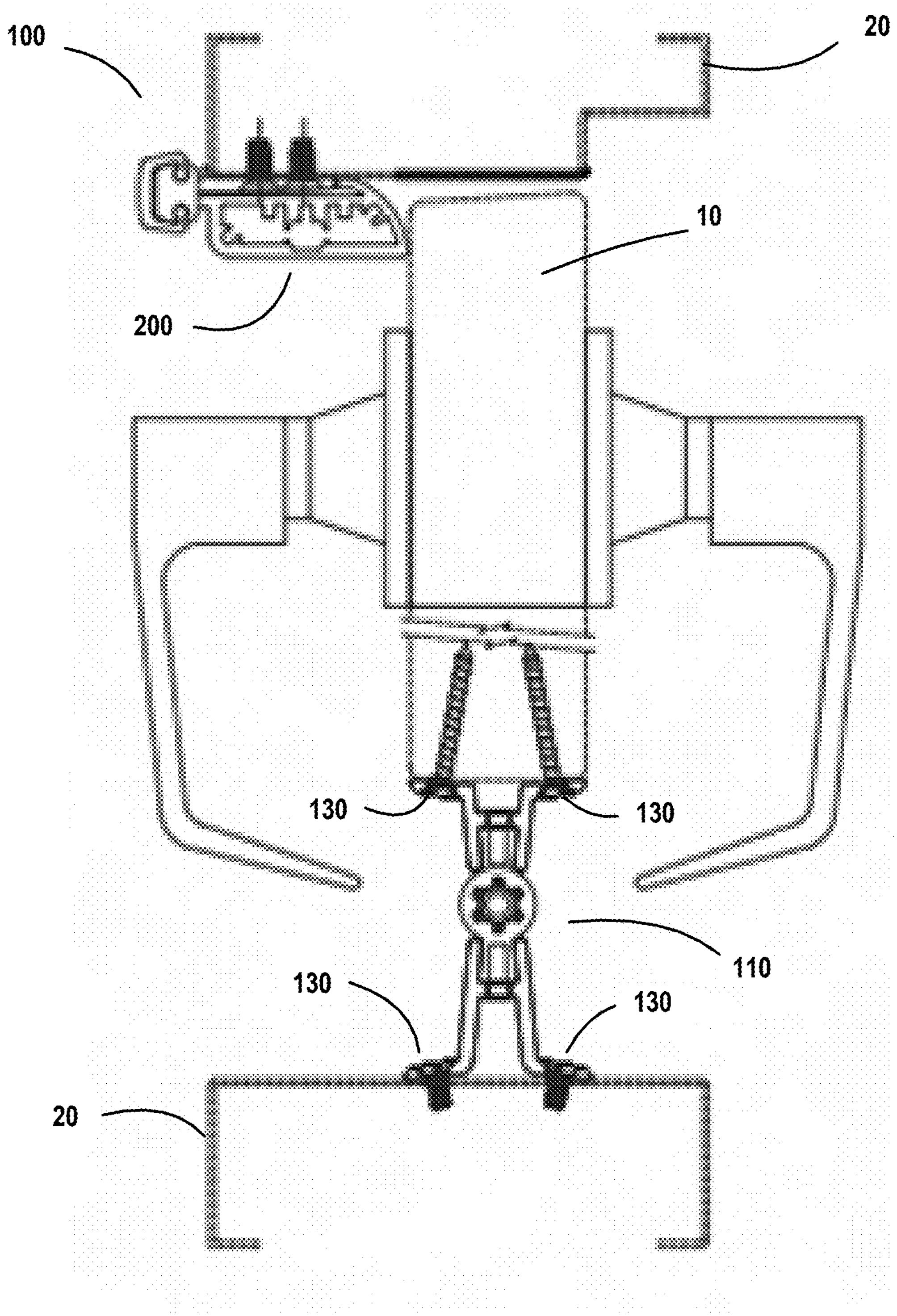
*FIG.* 3B

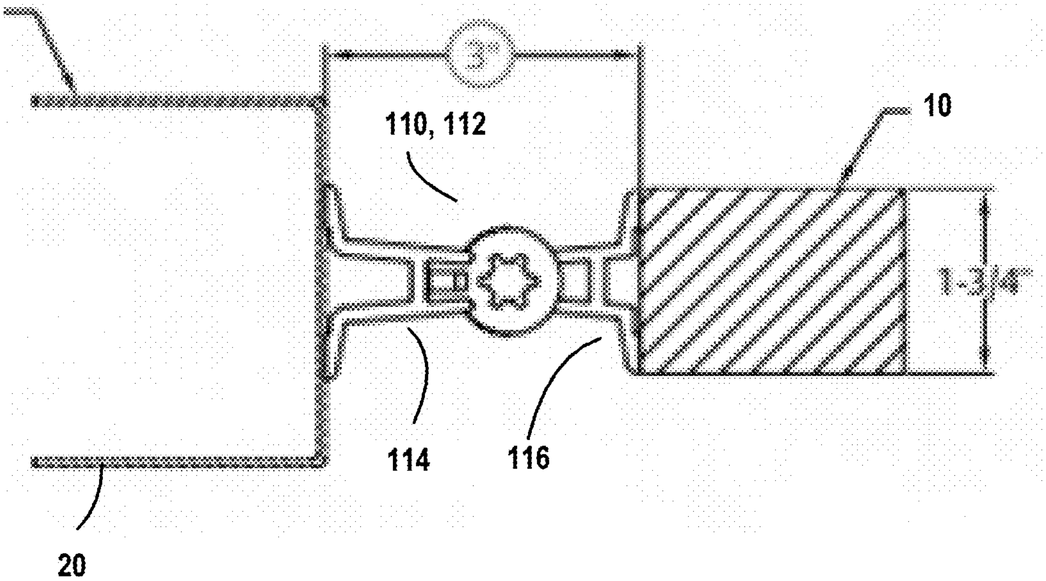
*FIG.* 5A
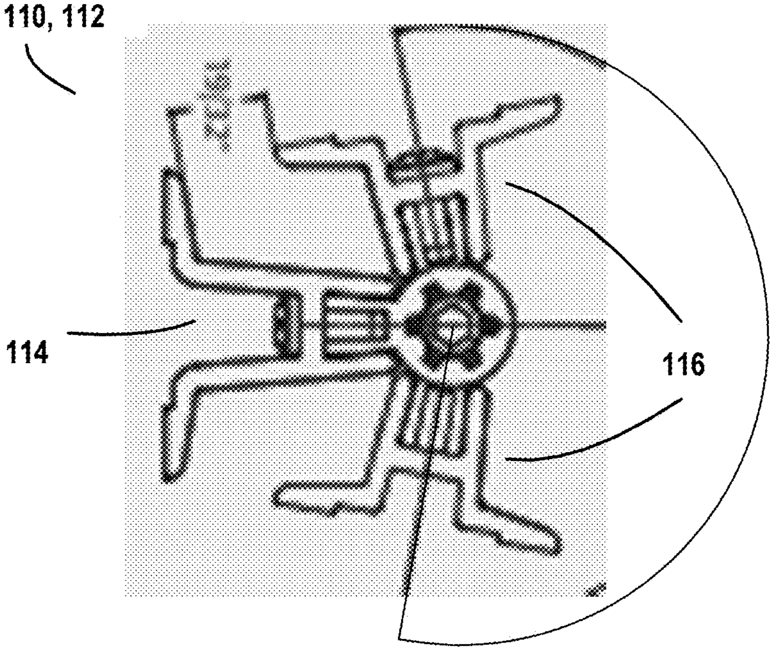
*FIG.* 5B

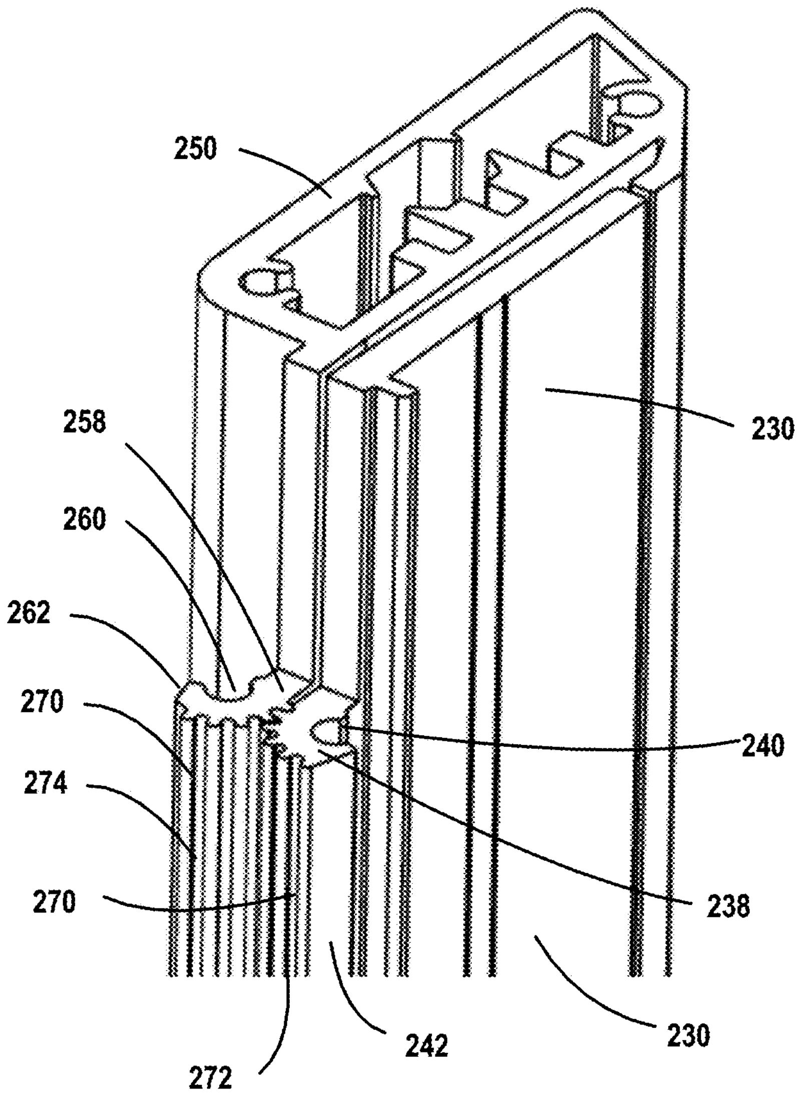
*FIG.* 9C

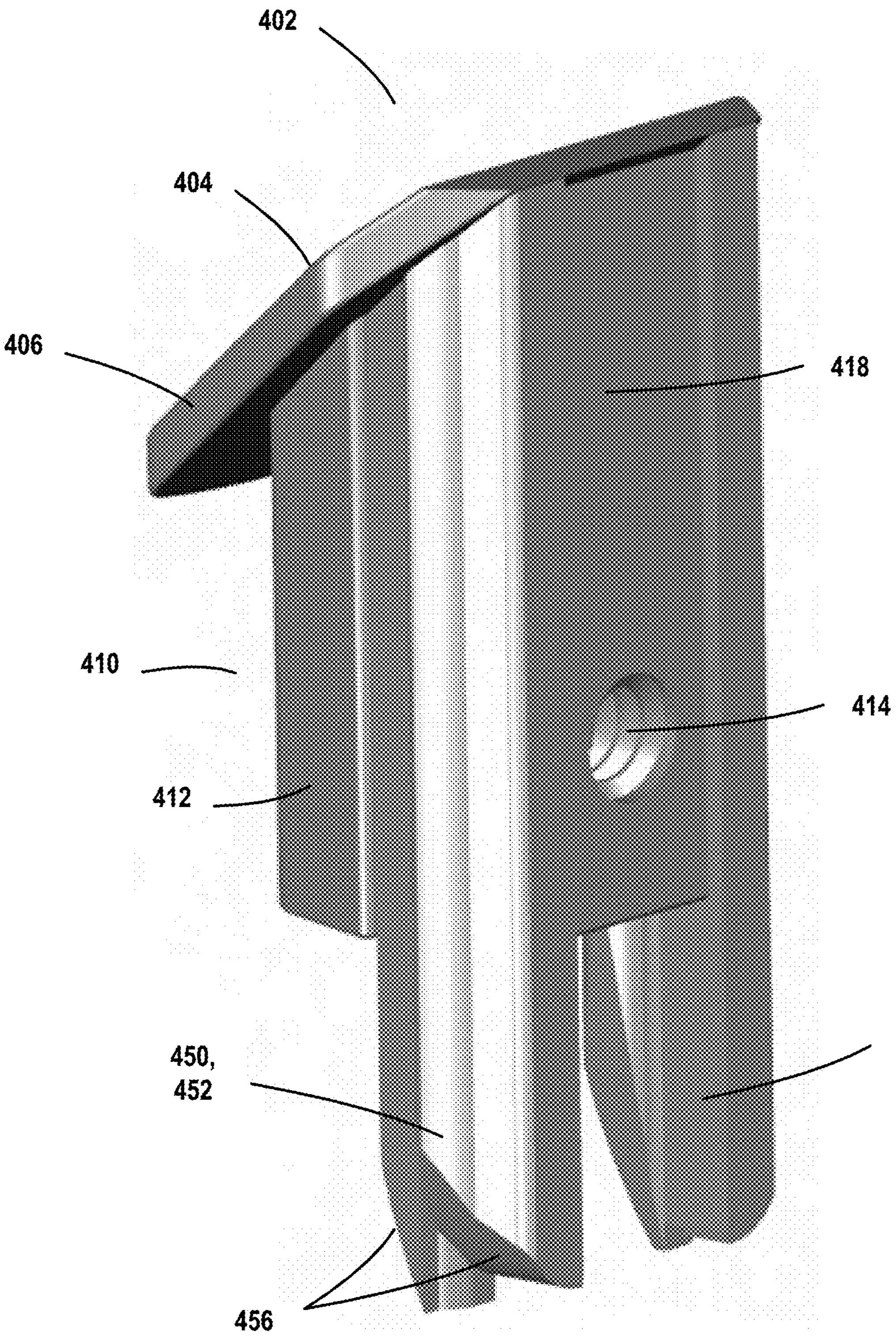
*FIG.* 11B

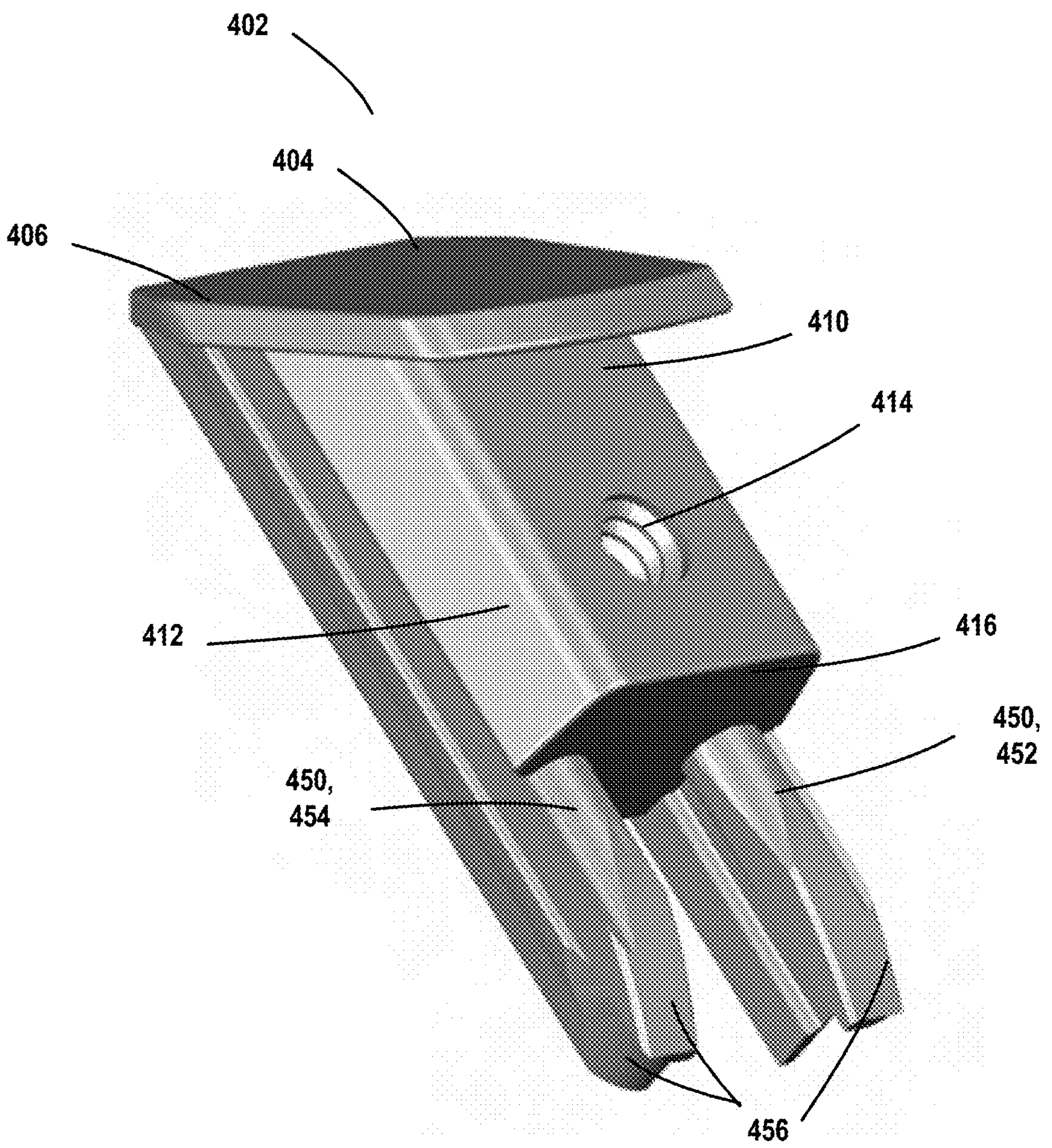
*FIG.* 11C

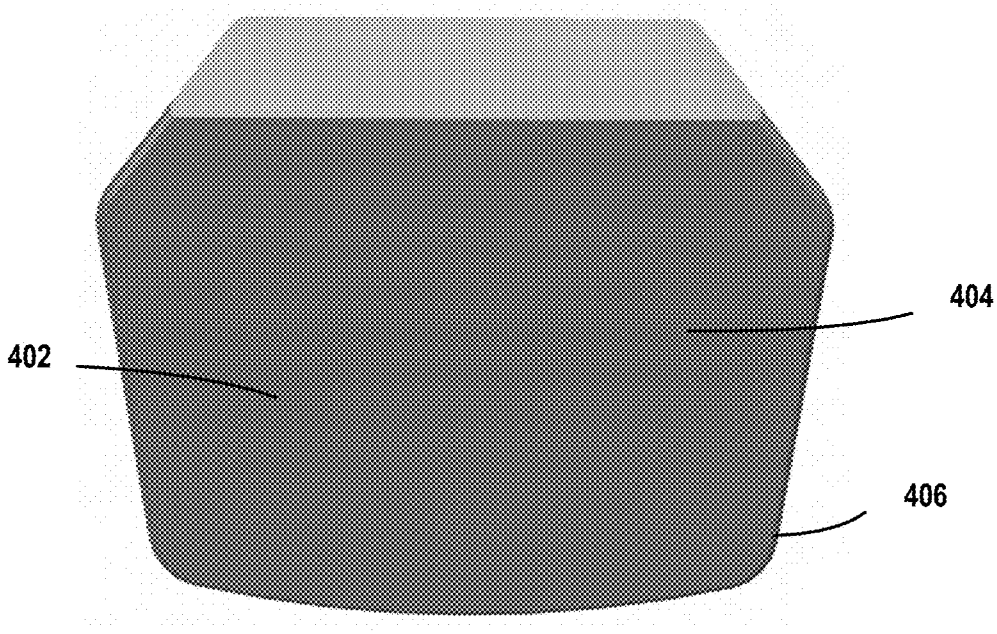
*FIG.* 11D
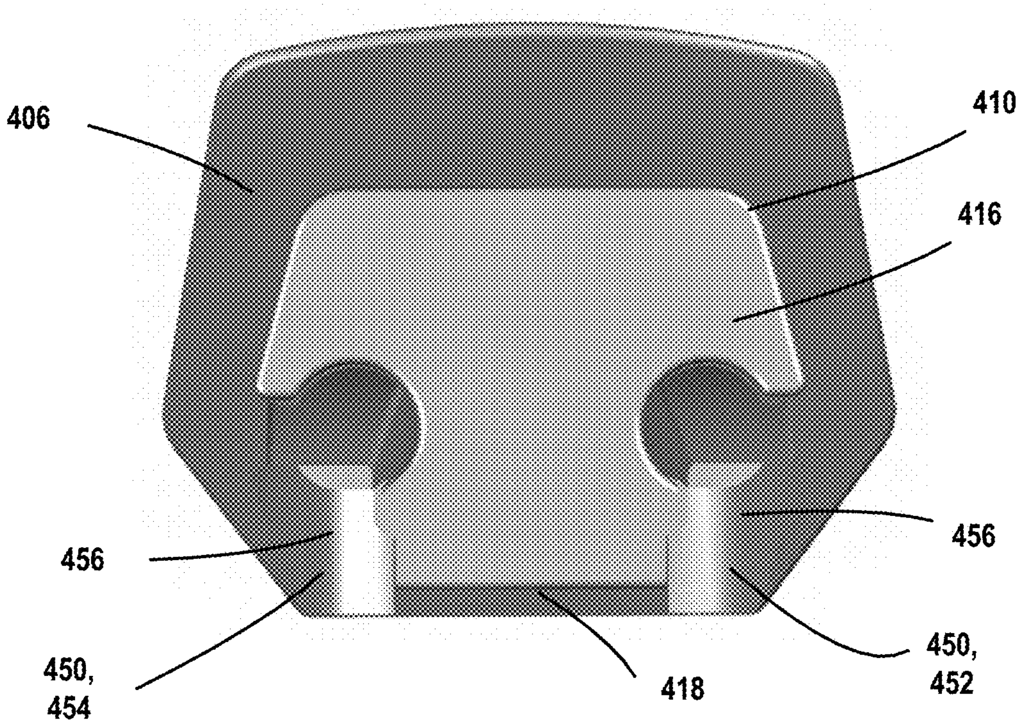
*FIG.* 11E

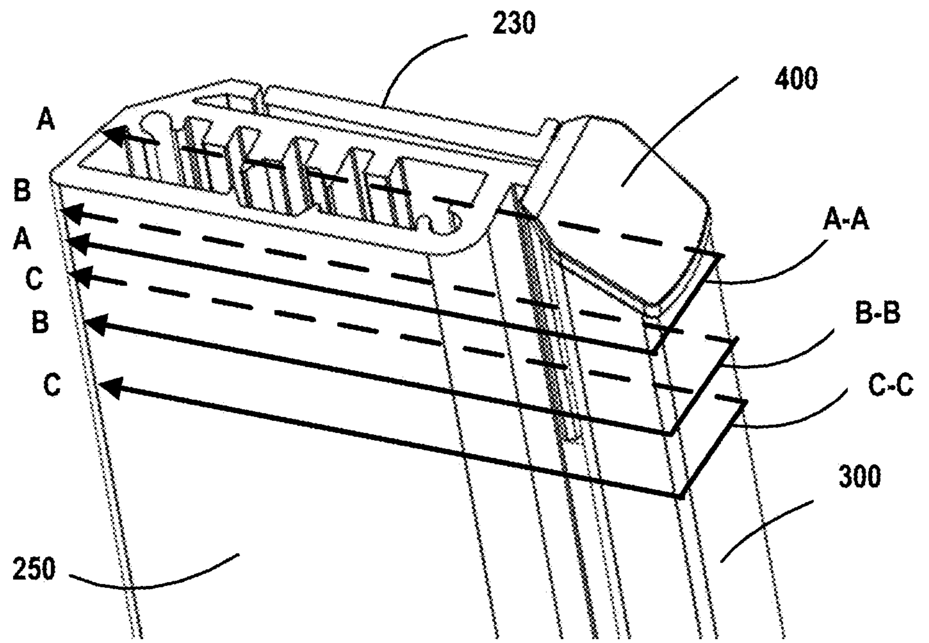
*FIG.* 12A
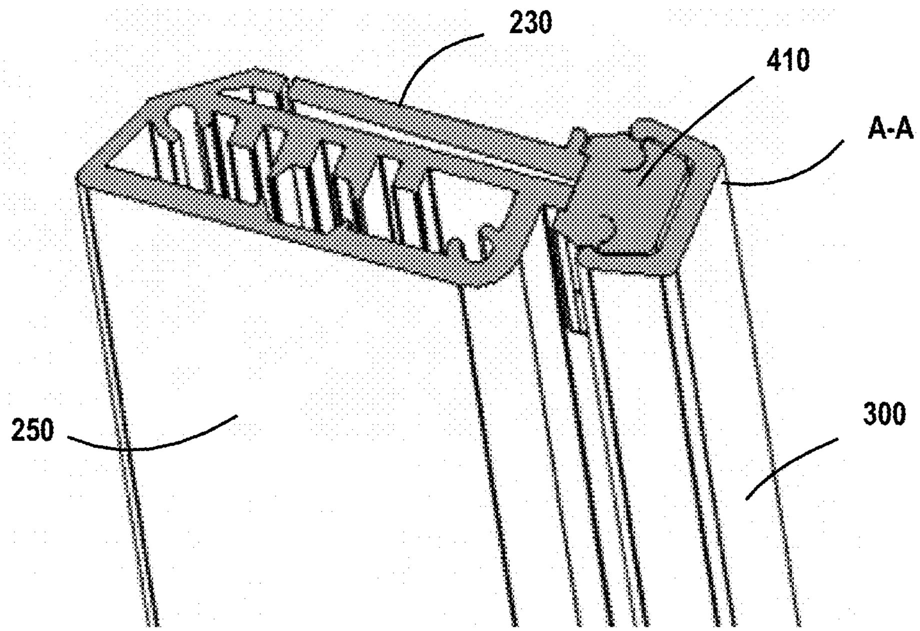
*FIG.* 12B

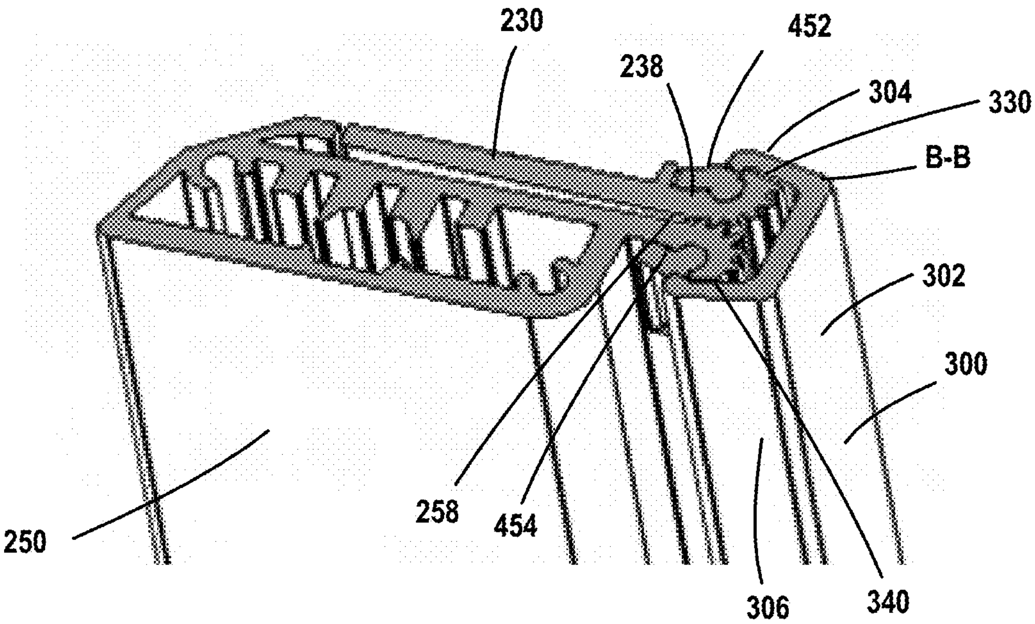
*FIG.* 12C
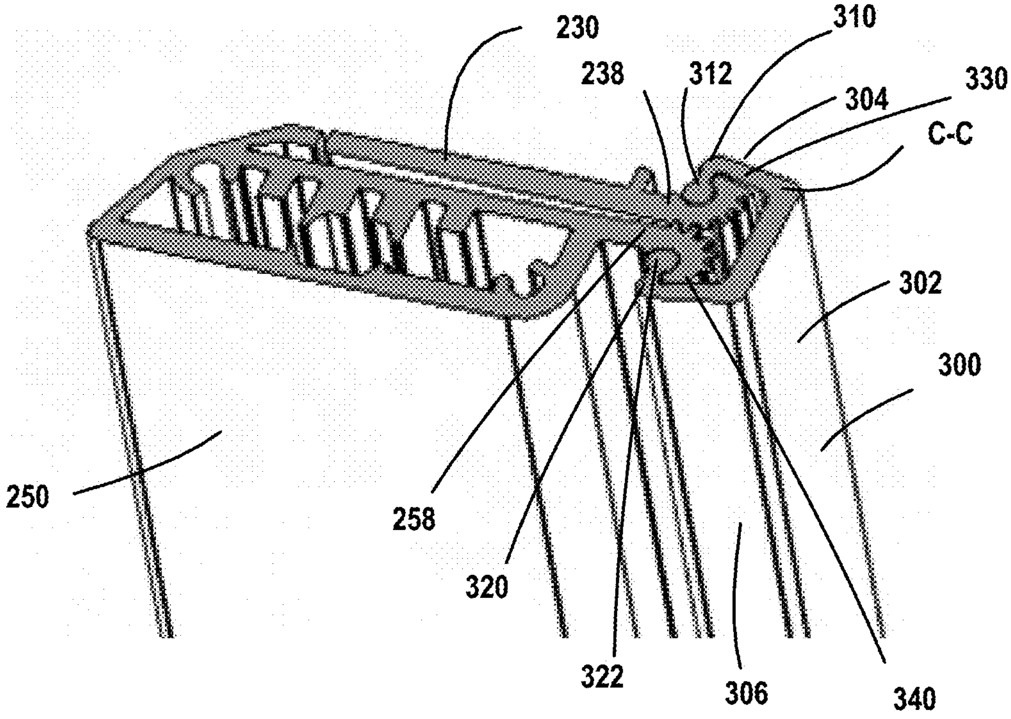
*FIG.* 12D

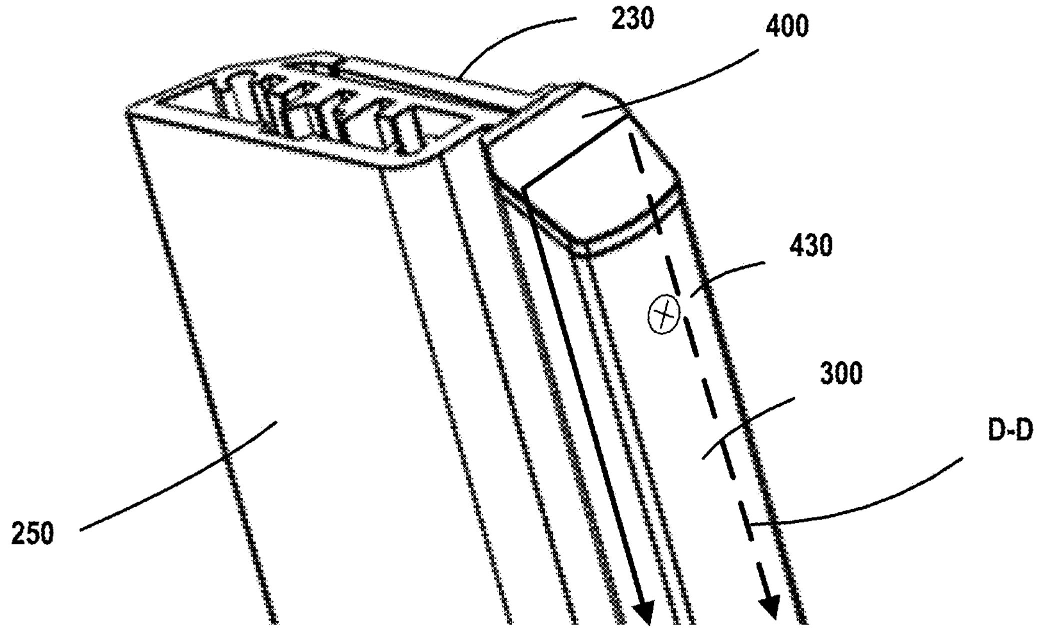
*FIG.* 13A
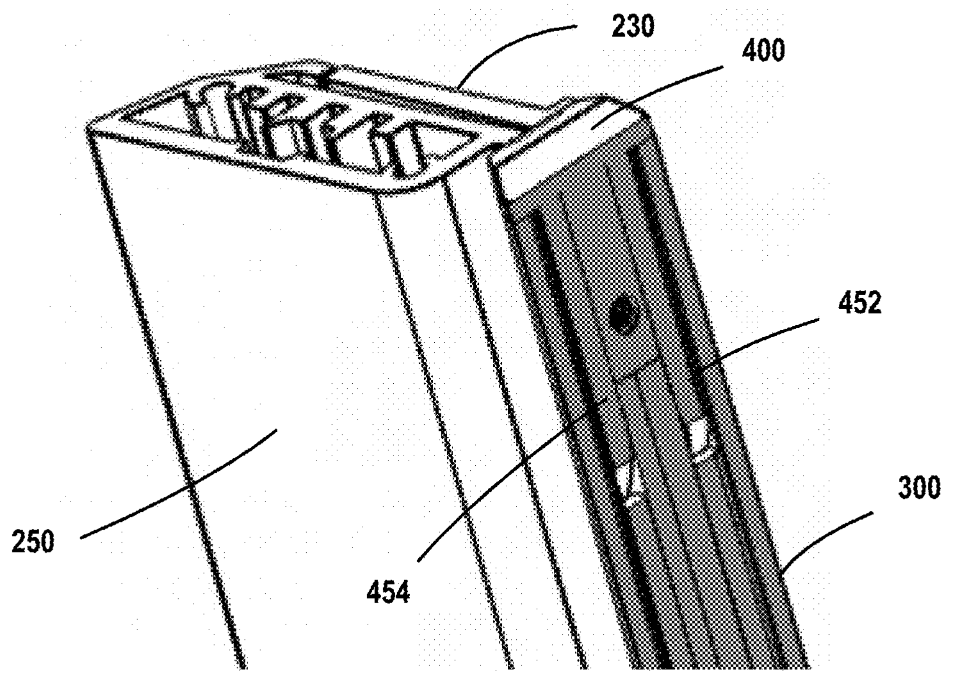
*FIG.* 13B

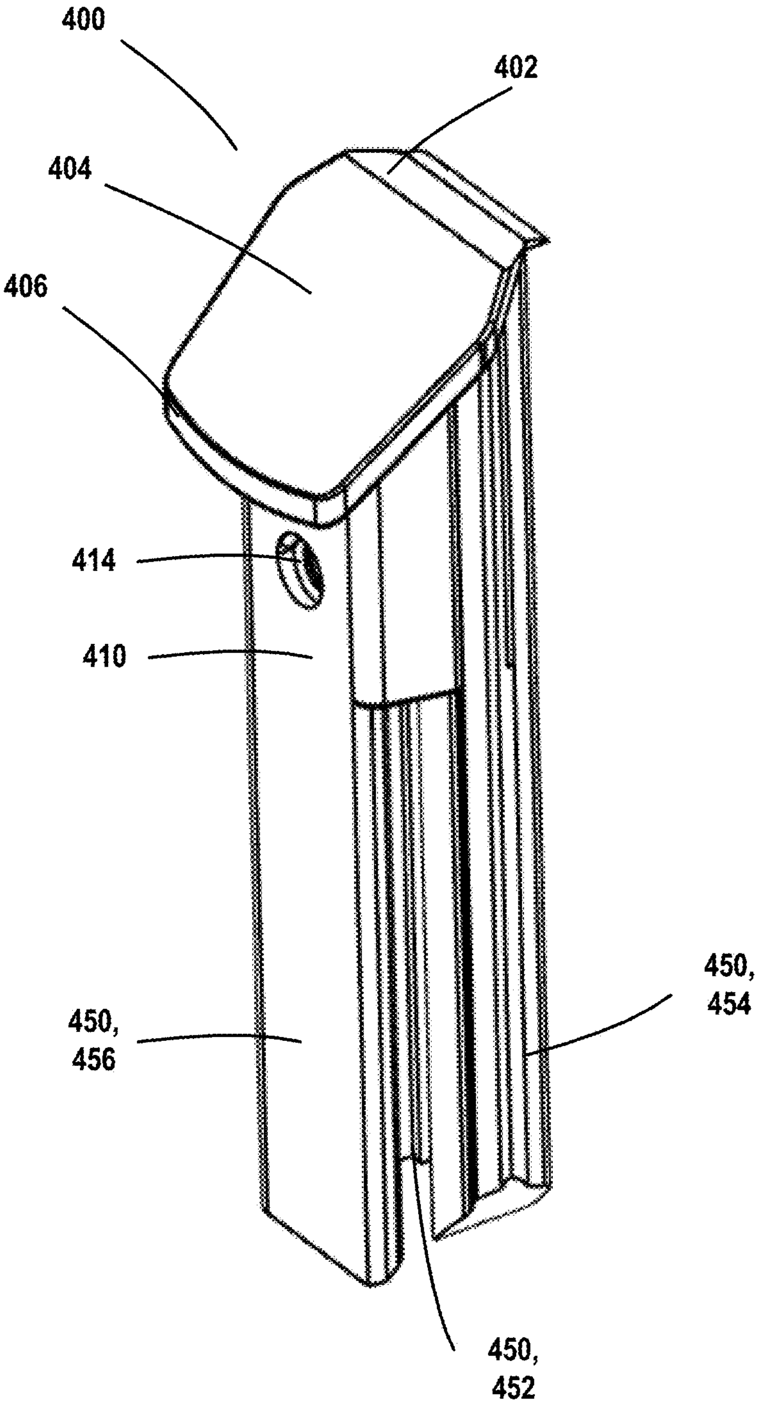
*FIG.* 15A

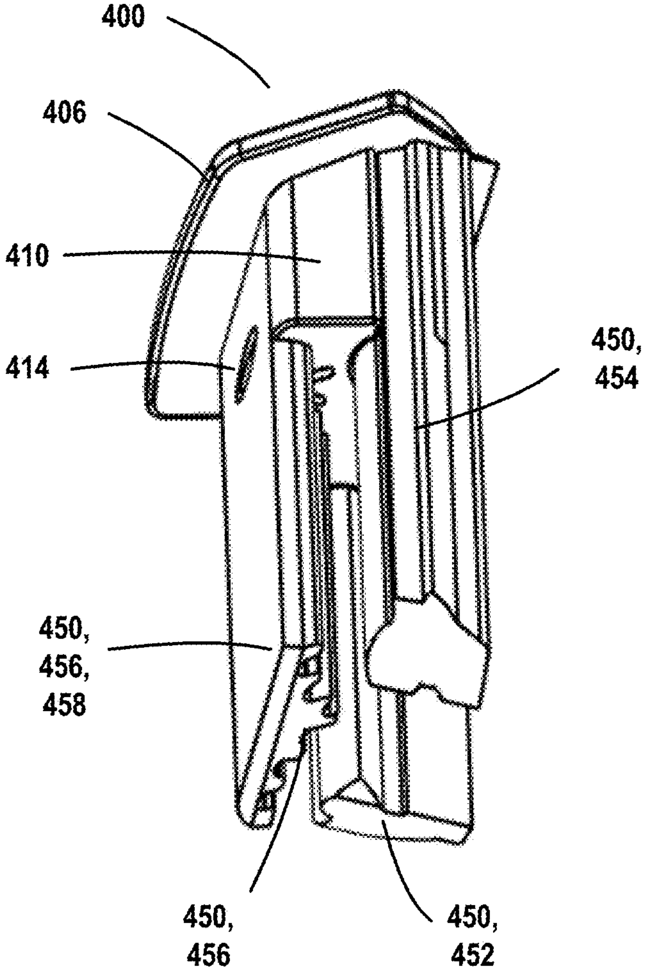
*FIG.* 15B

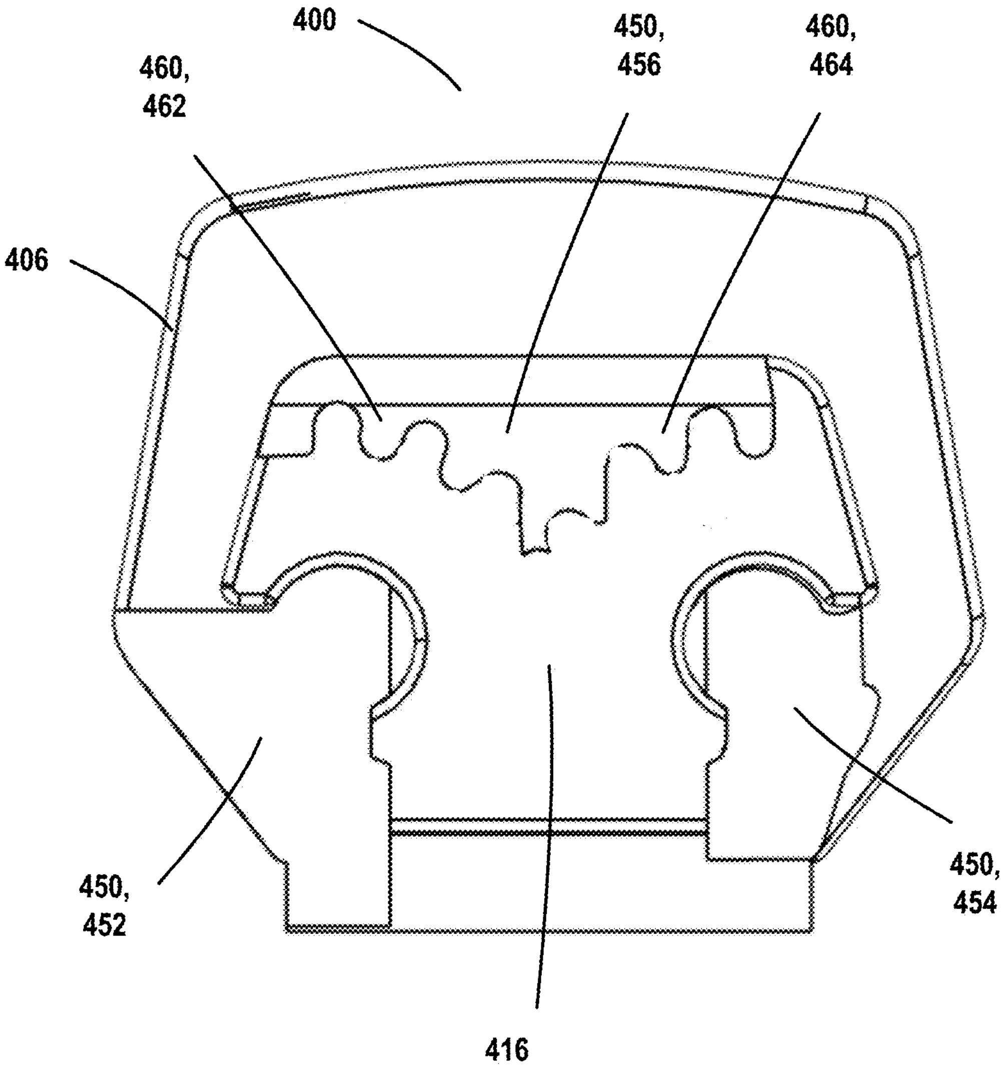
*FIG.* 15C

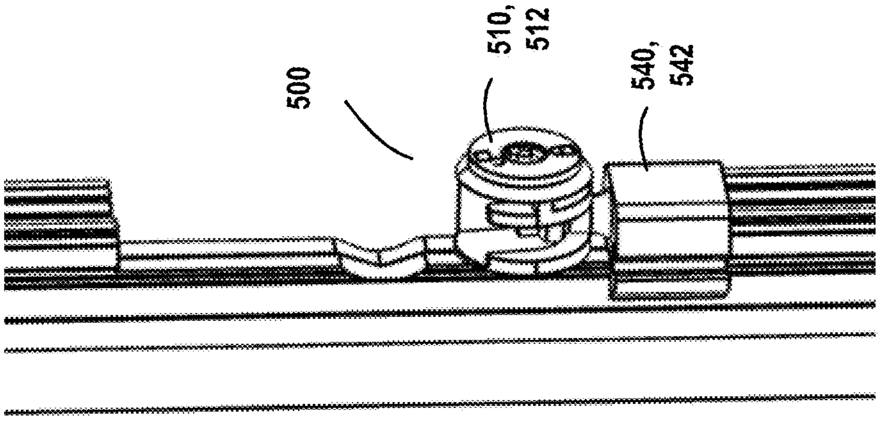
*FIG.* 18B
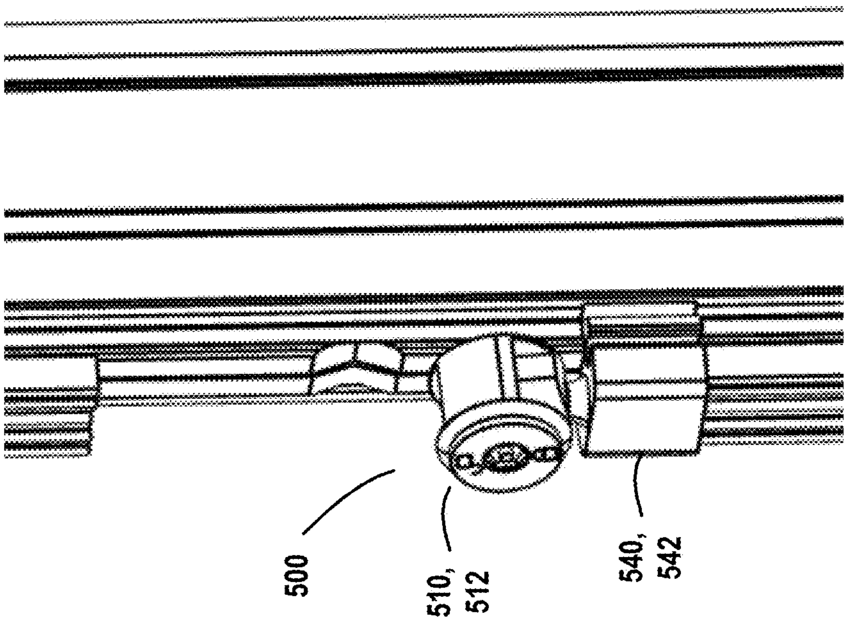
*FIG.* 18A

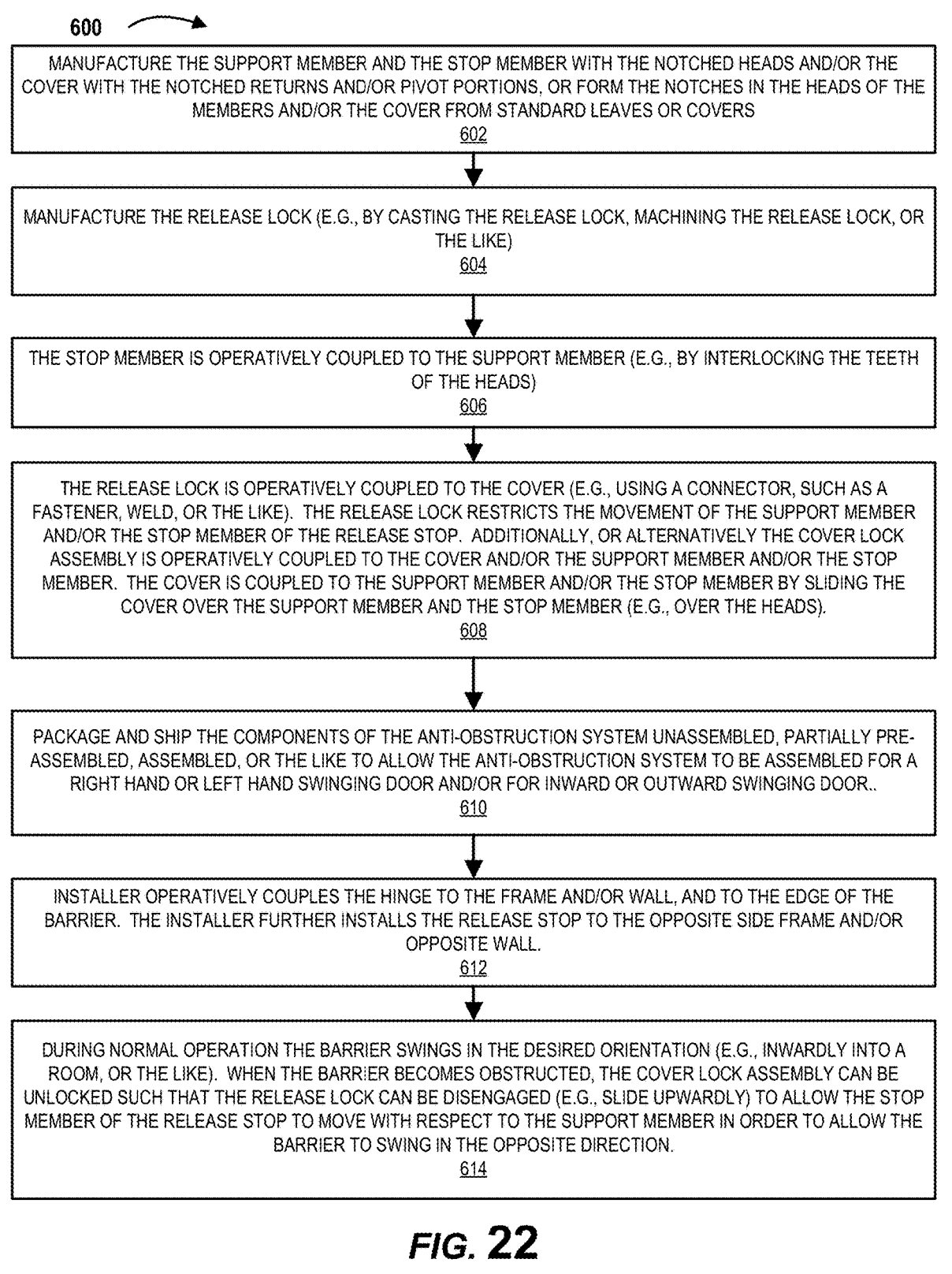

600

MANUFACTURE THE SUPPORT MEMBER AND THE STOP MEMBER WITH THE NOTCHED HEADS AND/OR THE COVER WITH THE NOTCHED RETURNS AND/OR PIVOT PORTIONS, OR FORM THE NOTCHES IN THE HEADS OF THE MEMBERS AND/OR THE COVER FROM STANDARD LEAVES OR COVERS
602

MANUFACTURE THE RELEASE LOCK (E.G., BY CASTING THE RELEASE LOCK, MACHINING THE RELEASE LOCK, OR THE LIKE)
604

THE STOP MEMBER IS OPERATIVELY COUPLED TO THE SUPPORT MEMBER (E.G., BY INTERLOCKING THE TEETH OF THE HEADS)
606

THE RELEASE LOCK IS OPERATIVELY COUPLED TO THE COVER (E.G., USING A CONNECTOR, SUCH AS A FASTENER, WELD, OR THE LIKE). THE RELEASE LOCK RESTRICTS THE MOVEMENT OF THE SUPPORT MEMBER AND/OR THE STOP MEMBER OF THE RELEASE STOP. ADDITIONALLY, OR ALTERNATIVELY THE COVER LOCK ASSEMBLY IS OPERATIVELY COUPLED TO THE COVER AND/OR THE SUPPORT MEMBER AND/OR THE STOP MEMBER. THE COVER IS COUPLED TO THE SUPPORT MEMBER AND/OR THE STOP MEMBER BY SLIDING THE COVER OVER THE SUPPORT MEMBER AND THE STOP MEMBER (E.G., OVER THE HEADS).
608

PACKAGE AND SHIP THE COMPONENTS OF THE ANTI-OBSTRUCTION SYSTEM UNASSEMBLED, PARTIALLY PRE-ASSEMBLED, ASSEMBLED, OR THE LIKE TO ALLOW THE ANTI-OBSTRUCTION SYSTEM TO BE ASSEMBLED FOR A RIGHT HAND OR LEFT HAND SWINGING DOOR AND/OR FOR INWARD OR OUTWARD SWINGING DOOR..
610

INSTALLER OPERATIVELY COUPLES THE HINGE TO THE FRAME AND/OR WALL, AND TO THE EDGE OF THE BARRIER. THE INSTALLER FURTHER INSTALLS THE RELEASE STOP TO THE OPPOSITE SIDE FRAME AND/OR OPPOSITE WALL.
612

DURING NORMAL OPERATION THE BARRIER SWINGS IN THE DESIRED ORIENTATION (E.G., INWARDLY INTO A ROOM, OR THE LIKE). WHEN THE BARRIER BECOMES OBSTRUCTED, THE COVER LOCK ASSEMBLY CAN BE UNLOCKED SUCH THAT THE RELEASE LOCK CAN BE DISENGAGED (E.G., SLIDE UPWARDLY) TO ALLOW THE STOP MEMBER OF THE RELEASE STOP TO MOVE WITH RESPECT TO THE SUPPORT MEMBER IN ORDER TO ALLOW THE BARRIER TO SWING IN THE OPPOSITE DIRECTION.
614

FIG. 22

ANTI-OBSTRUCTION SYSTEM HAVING A RELEASE STOP WITH RELEASE LOCK

PRIORITY CLAIM UNDER 35 U.S.C. § 119

The present Application for a Patent claims priority to U.S. Provisional Patent Application Ser. No. 63/533,533 entitled "Anti-obstruction System Having a Release Stop with Release Lock," filed on Aug. 18, 2023, both of which are assigned to the assignee hereof and hereby expressly incorporated by reference herein.

FIELD

The present disclosure generally relates to anti-obstruction systems, and in particular, a release lock and/or cover lock for the emergency release stop of the anti-obstruction system.

BACKGROUND

Anti-obstruction door systems are utilized in order to allow an in-swinging door to swing outwardly (e.g., from a room, or the like) when the in-swinging door is obstructed (e.g., barricaded, blocked by a person, or the like). Anti-obstruction door systems may be utilized in facilities, including medical facilities, which may require the use of anti-obstruction door systems in order to allow people (e.g., professionals, or the like) to access locations of a structure when an in-swinging door is obstructed. Anti-obstruction door system products, including hinges and release stops of anti-obstruction door systems, may be improved.

SUMMARY

Embodiments of the disclosure relate to an anti-obstruction system utilized to improve safety and mitigate risk in the event a barrier (e.g., door, or the like) providing egress into a structure (e.g., building, room, or the like) becomes obstructed by objects or a person. In particular embodiments, the anti-obstruction system may be utilized in medical, behavioral health, and/or assisted living environments, such as in rooms (e.g., patient, resident, or the like rooms), bathrooms, cross corridor bathrooms, or other areas. The anti-obstruction systems of the present disclosure provides an improved efficient solution to access someone in the event a barrier is obstructed and not able to open (e.g., not able to open inwardly). That is, in an emergency the barrier is able to swing in the opposite direction from the normal operation in order to minimize potential risks to people located on the opposite side of an obstructed barrier.

As will be discussed in further detail herein, the anti-obstruction system utilizes a hinge (e.g., a double swing hinge, or the like), a release stop (otherwise described herein as an emergency release stop), and/or handle and lock hardware. The hinge is operatively coupled to a frame and/or a wall, and an edge of a barrier (e.g., a door), while the release stop is operatively coupled to an opposing frame and/or an opposing wall. The release stop, as will be described in further detail herein, acts as the stop for the barrier so that the barrier can only swing in one direction (e.g., into a room). However, when the barrier is required to swing in an opposite direction (e.g., outwardly from a room) the release stop may be disengaged to allow the barrier to swing in another direction (e.g., outwardly from a room).

Instead of using a traditional stop located in the barrier frame, the anti-obstruction system of the present invention utilizes a release stop, which when engaged only allows the barrier to swing in one direction (e.g., inwardly or outwardly). Alternatively, when the release stop is disengaged the barrier may swing in two directions (e.g., inwardly and outwardly). The release stop comprises a first release portion and a second release portion, a cover, and a release lock. When in the locked position the release stop acts as a frame stop that prevents a barrier from swinging past the release stop. However, when there is a need for the barrier to swing past the release stop, such as when an inwardly swinging door is obstructed, a release lock is moved from an engaged position to a disengaged position in order allow the release stop to move such that the barrier is able to swing in both directions (e.g., outwardly and inwardly).

The release lock may comprise, a head, a body operatively coupled to the head, and one or more projections (e.g., legs, or the like) operatively coupled to the body (e.g., extending from the body, or the like). The one or more projections of the release lock aid in restricting the movement of the release stop. For example, when the release lock is installed, the first release portion (otherwise described as a support member, a frame support member, or the like) and/or the second release portion (otherwise described as a stop member, swing stop member, or the like) are restricted from moving with respect to each other and/or with respect to the cover. In particular embodiments, the one or more projections may comprise a first release projection and a second release projection. As will be described in further detail herein, the first release projection may be utilized to restrict the movement between the cover and the first release portion of the release stop, while the second release projection may be utilized to restrict the movement between the cover and the second release portion.

One embodiment of the invention is a release stop for a barrier. The release stop comprises a support member configured to be operatively coupled with a frame or wall, a stop member operatively coupled with the support member, a cover operatively coupled to the support member and the stop member, and a release lock operatively coupled to the support member, the stop member, or the cover. When the release lock is in a first position the stop member is restricted from moving with respect to the support member, and when the release lock is in a second position the stop member is allowed to move with respect to the support member.

In further accord with embodiments, the stop member comprises a stop web, and a stop head with stop teeth, wherein the stop head extends from the stop web.

In other embodiments, the support member comprises a support web and a support head with support teeth, wherein the support head extends from the support web.

In yet other embodiments, the cover extends over at least a portion of the support head and the stop head.

In still other embodiments, the release lock comprises a lock body, and one or more lock projections extending from the lock body. The one or more lock projections restrict the cover from moving with respect to the stop member or the support member.

In other embodiments, the stop head with the stop teeth and the support head with the support teeth are notched with respect to the stop web and the support web.

In further accord with embodiments, the cover comprises a cover web, one or more cover flanges, and one or more returns extending from the one or more cover flanges. The one or more returns are notched with respect to the one or more cover flanges, and wherein the stop head or the support head receive the one or more returns.

In other embodiments, the release lock is configured for operative coupling with the cover through a release connector.

In yet other embodiments, the release stop further comprises a cover lock assembly. The cover lock assembly comprises a cover lock and a cover lock member. The cover lock member is operatively coupled with the support member or the stop member. The cover lock is operatively coupled to the cover. When locked, the cover lock is operatively coupled to the cover lock member to restrict movement of the cover, and when unlocked the cover lock is separated from the cover lock member such the cover lock can move with the cover.

In still other embodiments, the release lock comprises a lock body, and one or more lock projections extending from the lock body. The one or more lock projections restrict the cover from moving with respect to the stop member or the support member.

In other embodiments, the release lock further comprises a lock head operatively coupled to the lock body, wherein the lock head has a lock flange that extends over a cover end and is at least partially flush with an outer cover surface.

In further accord with embodiments, the release lock further comprises a lock cover. The lock cover is operatively coupled to the support member and the stop member and mates with the cover.

In other embodiments the one or more lock projections comprise a stop member projection that restricts movement between the stop member and the cover.

In still other embodiments, the one or more lock projections comprise a support member projection that restricts movement between the support member and the cover.

In yet other embodiments, the one or more lock projections comprise a tooth projection that restricts movement between teeth of the support member and teeth of the stop member, or between the teeth of the support member or the teeth of the stop member and the cover.

In still other embodiments, the release stop further comprises a coupling that extends through and operatively couples the cover and the release lock.

Another embodiment of the invention is a release lock for a release stop. The release lock comprises a lock body, and one or more lock projections extending from the lock body. The one or more lock projections restrict a cover of the release stop from moving with respect to a stop member or a support member of the release stop.

In further accord with embodiments, the release further comprises a lock head operatively coupled to the lock body. The lock head has a lock flange that extends over a cover end and is at least partially flush with an outer cover surface of the cover of the release stop.

In other embodiments, the one or more lock projections comprise a stop member projection that restricts movement between the stop member and the cover of the release stop, or a support member projection that restricts movement between the support member and the cover of the release stop.

Another embodiment of the invention comprises a method of using an anti-obstruction system for allowing a barrier that swings inwardly to swing outwardly. The anti-obstruction system comprises a double swing hinge operatively coupled adjacent a first edge of the barrier and to a frame or a wall. The anti-obstruction system further comprising a release stop comprising a support member operatively coupled with a frame or wall, a stop member operatively coupled with the support member, a cover operatively coupled to the support member and the stop member, and a release lock operatively coupled to the support member, the stop member, or the cover. The method comprises disengaging the release lock from a first position in which the stop member is restricted from moving with respect to the support member into a second position that allows the stop member to move with respect to the support member. The method further comprises swinging the barrier outwardly past the stop member.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings.

Figure 1:
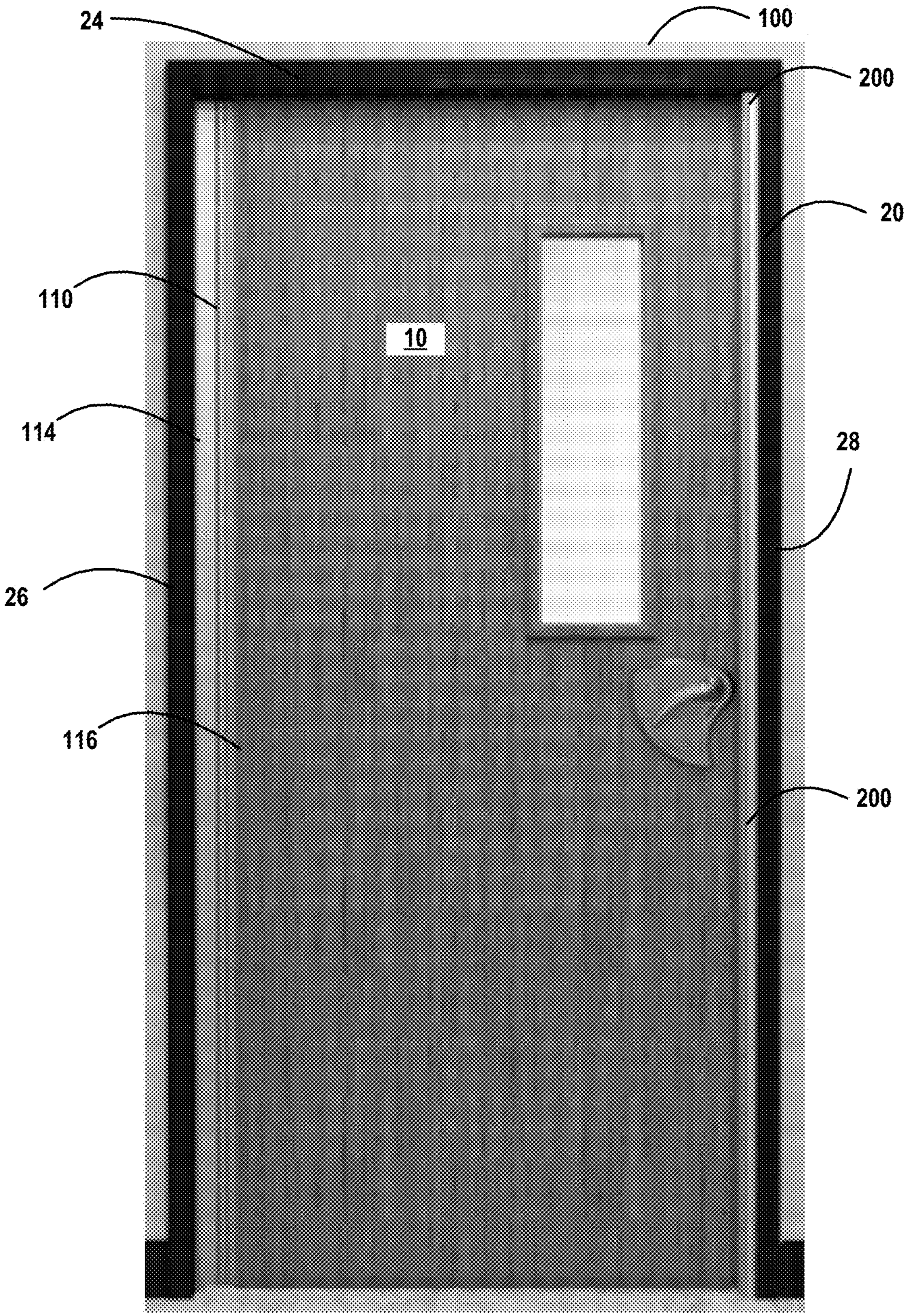

FIG. 1 is an outside view of an anti-obstruction door system with a double swing hinge and a release stop, in accordance with embodiments of the present disclosure.

Figure 2:
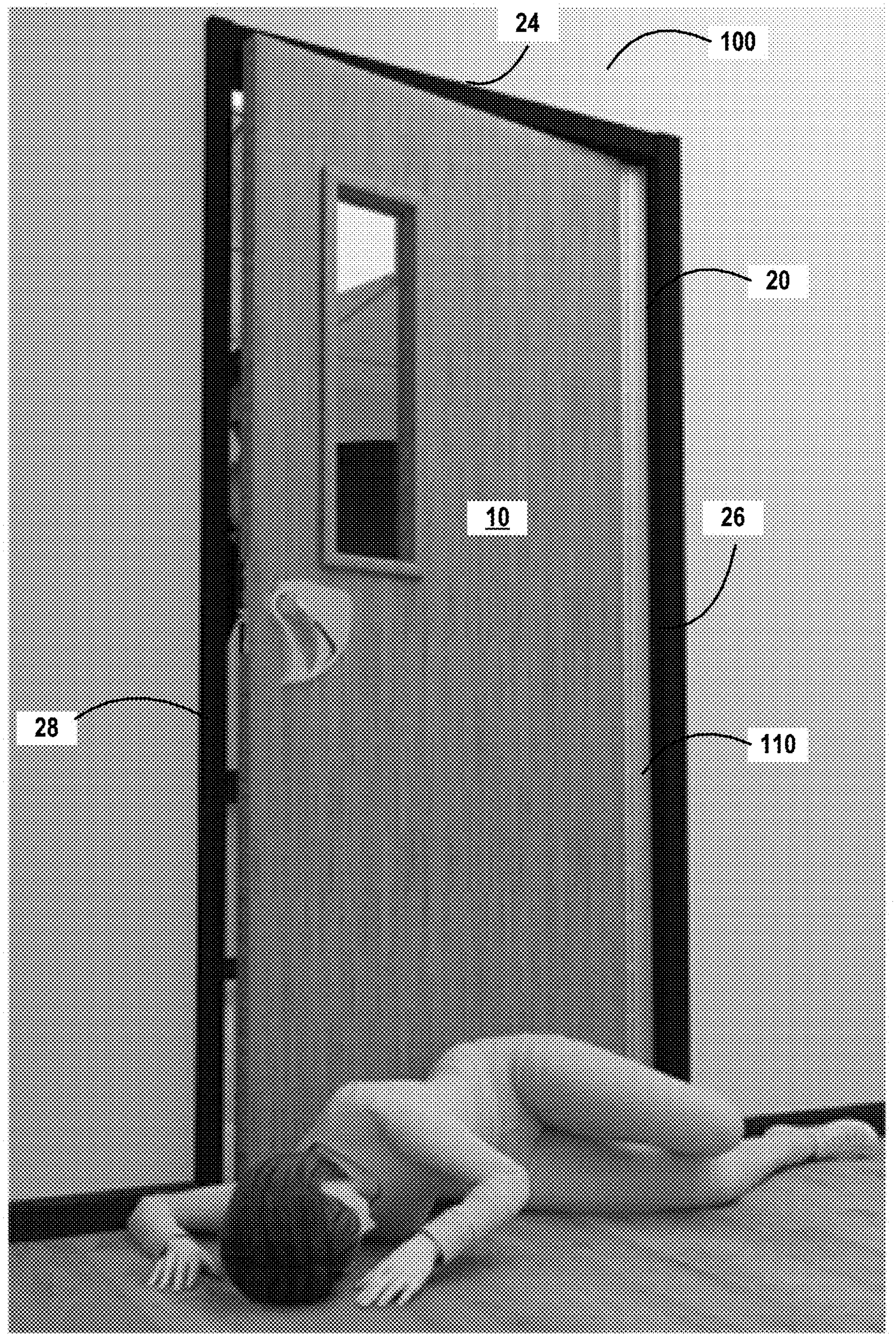

FIG. 2 is an inside view of the anti-obstruction door system when obstructed, in accordance with embodiments of the present disclosure.

FIG. 3A is a cross-sectional top view of an anti-obstruction door system for a left-hand inward opening door, in accordance with embodiments of the present disclosure.

FIG. 3B is a cross-sectional top view of an anti-obstruction door system for a right-hand inward opening door, in accordance with embodiments of the present disclosure.

Figure 4:
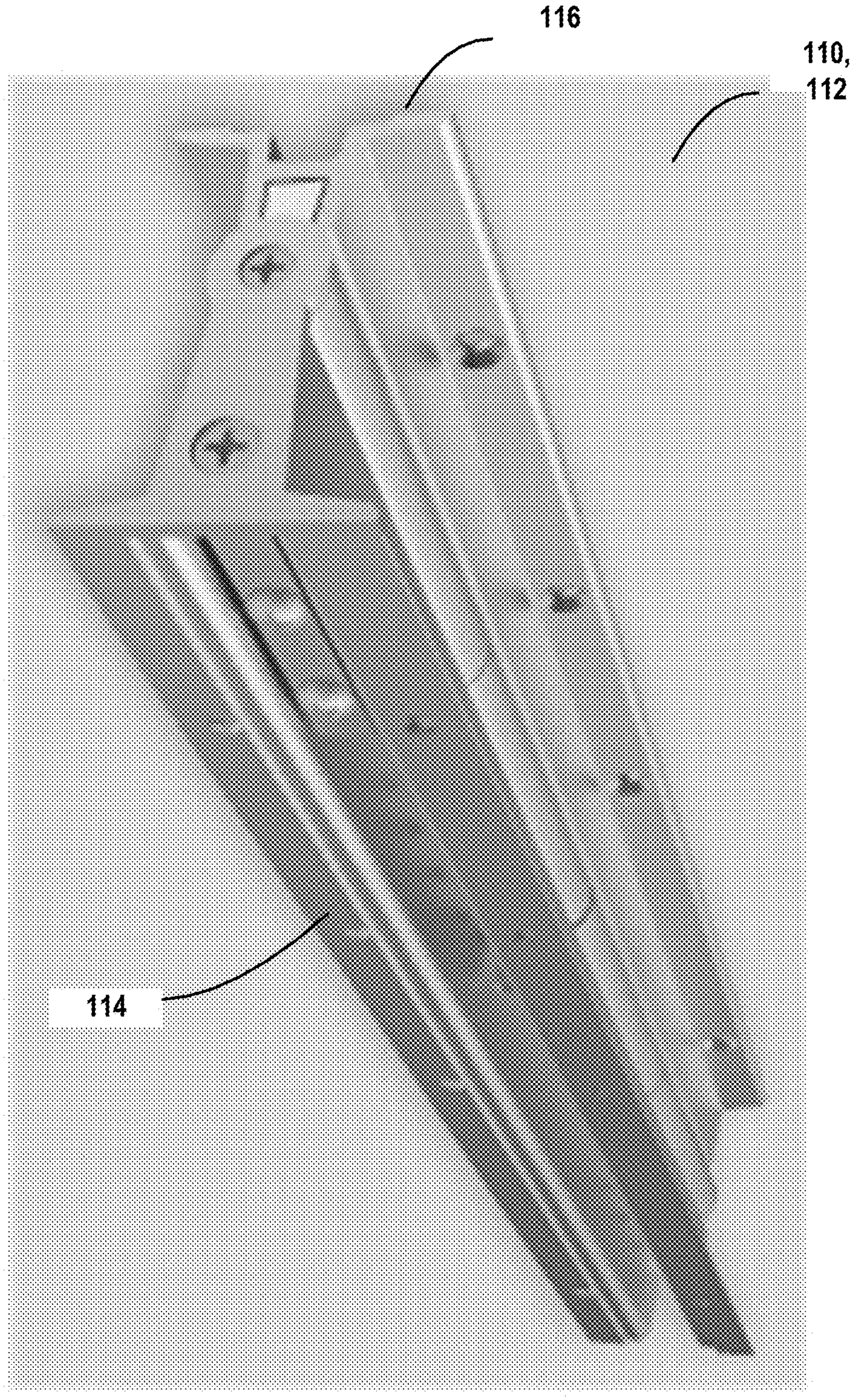

FIG. 4 is a perspective view of a double swing hinge for an anti-obstruction door system, in accordance with embodiments of the present disclosure.

FIG. 5A is a cross-sectional top view of a double swing hinge for an anti-obstruction door system, in accordance with embodiments of the present disclosure.

FIG. 5B is a cross-sectional top view of the range of movement of the double swing hinge, in accordance with embodiments of the present disclosure.

Figure 6:
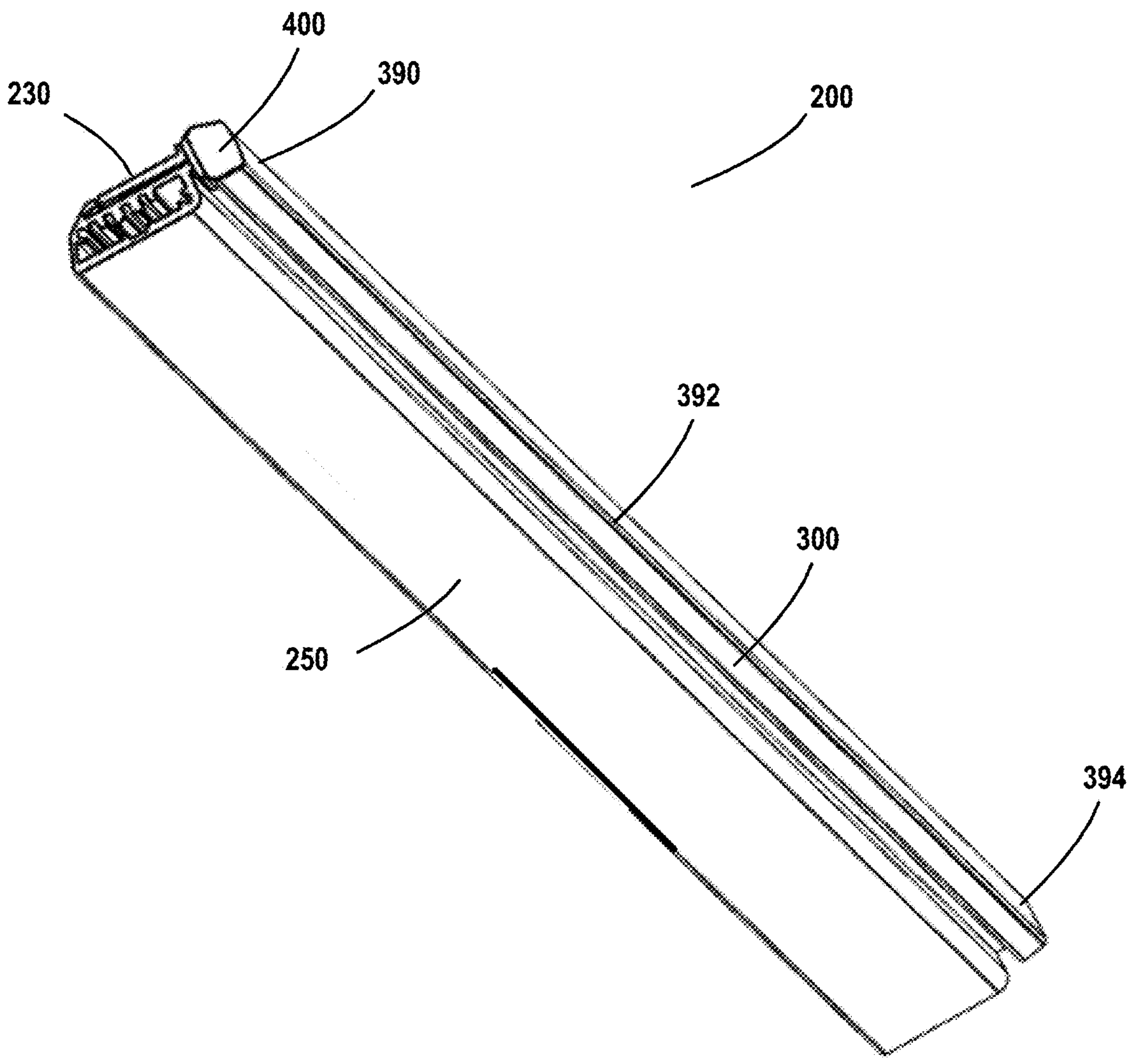

FIG. 6 is a perspective view of a release stop for an anti-obstruction door system, in accordance with embodiments of the present disclosure.

Figure 7A:
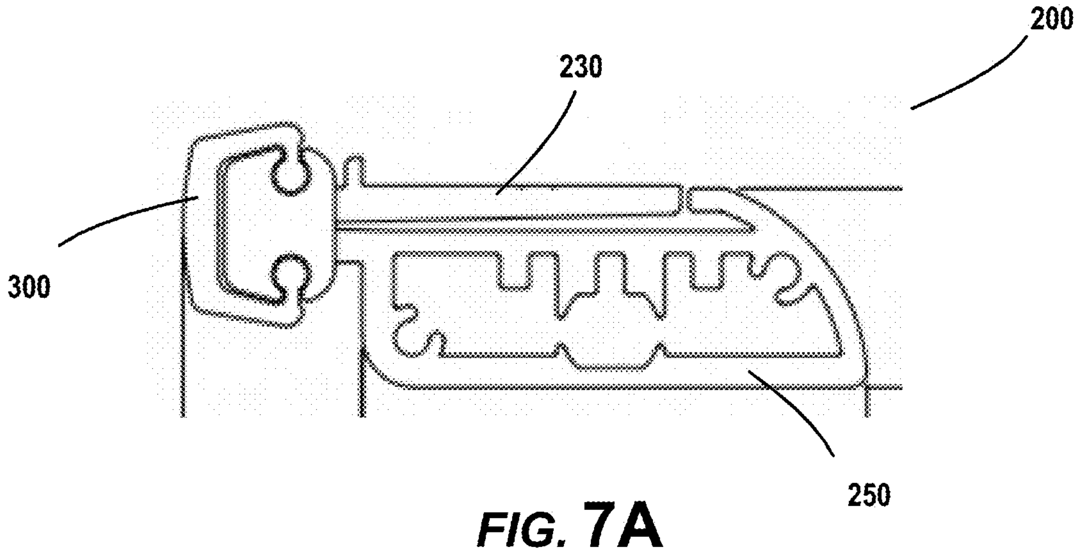

FIG. 7A is a cross-sectional top view of a release stop for an anti-obstruction door system, in accordance with embodiments of the present disclosure.

Figure 7B:
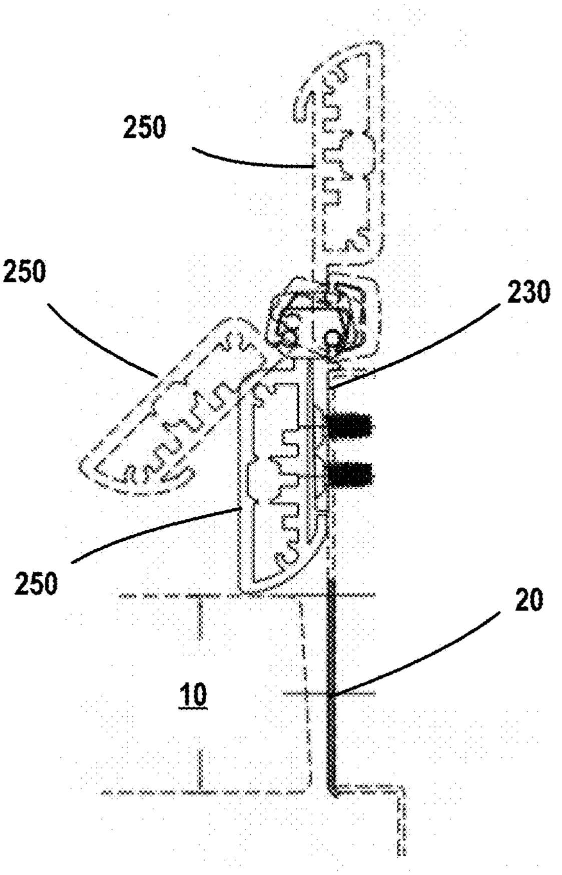

FIG. 7B is a cross-sectional top view of the range of movement of the release stop for an anti-obstruction door system, in accordance with embodiments of the present disclosure.

Figure 8B:
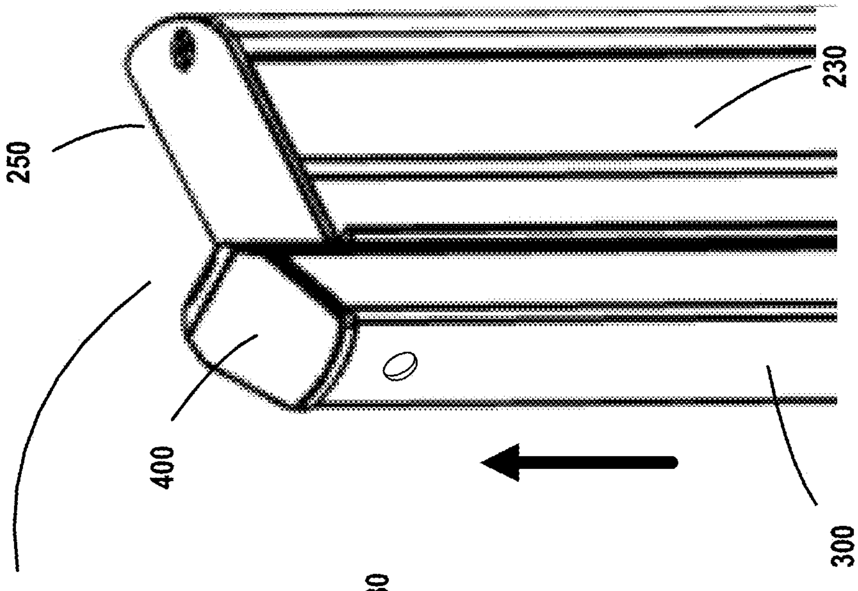
Figure 8A:
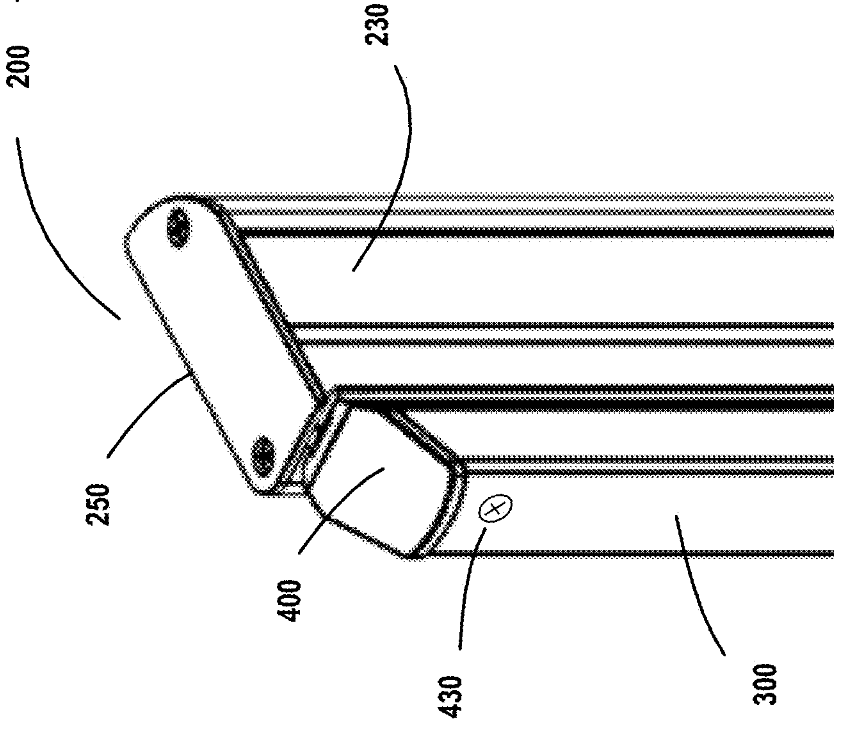

FIG. 8A is an enlarged view of the release stop with the release lock engaged, in accordance with embodiments of the present disclosure.

FIG. 8B is an enlarged view of a portion of the release stop with the release lock disengaged, in accordance with embodiments of the present disclosure.

Figures 9A, 9B:
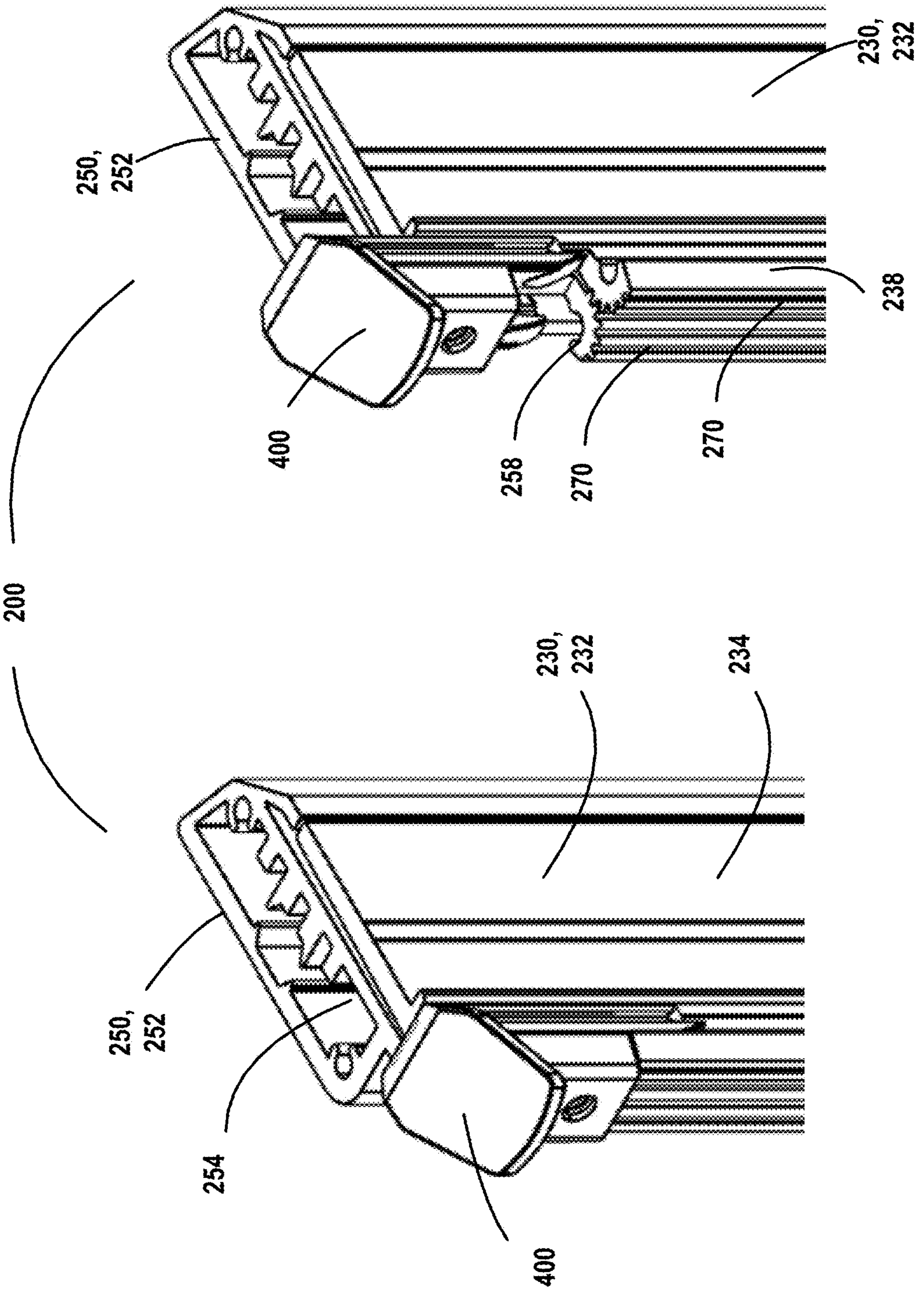

FIG. 9A is an enlarged view of a portion of the release stop with the hinge cover removed and the release lock engaged, in accordance with embodiments of the present disclosure.

FIG. 9B is an enlarged view of a portion of the release stop with the hinge cover removed and the release lock disengaged, in accordance with embodiments of the present disclosure.

FIG. 9C is an enlarged view of a portion of the release stop with the hinge cover and the release lock removed, in accordance with embodiments of the present disclosure.

Figure 10A:
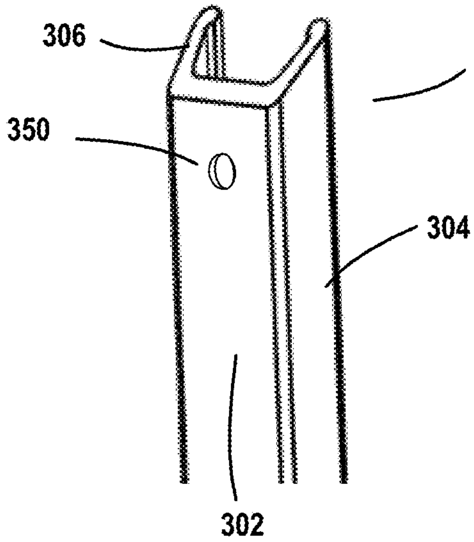

FIG. 10A is an enlarged perspective front view of a portion of the cover, in accordance with embodiments of the present disclosure.

Figure 10B:
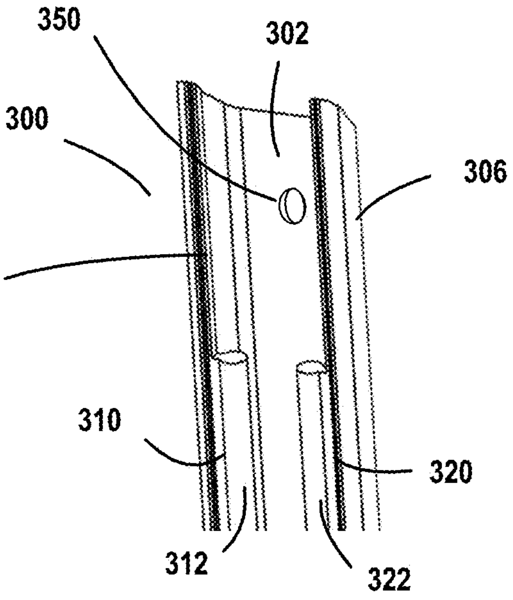

FIG. 10B is an enlarged perspective rear view of a portion of the cover, in accordance with embodiments of the present disclosure.

Figure 10C:
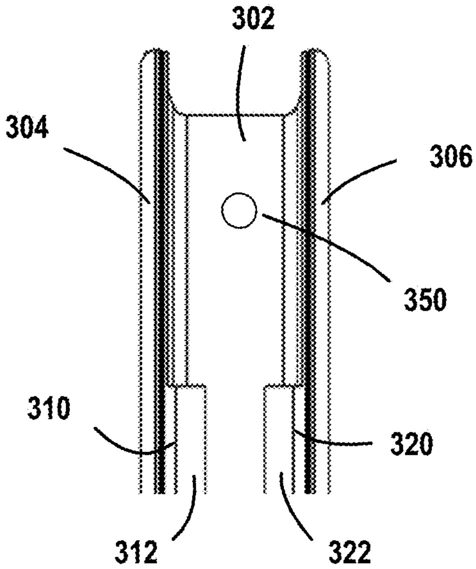

FIG. 10C is an enlarged rear view of a portion of the cover, in accordance with embodiments of the present disclosure.

Figure 10D:
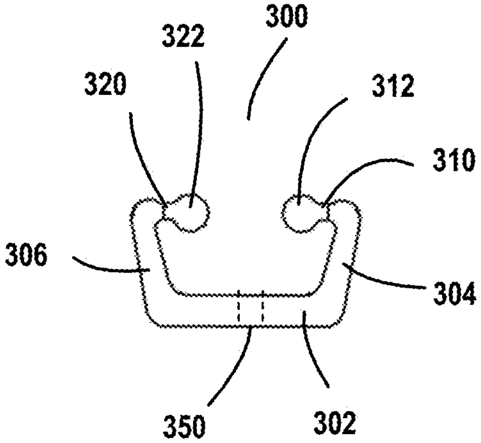

FIG. 10D is a top view of the cover, in accordance with embodiments of the present disclosure.

Figure 11A:
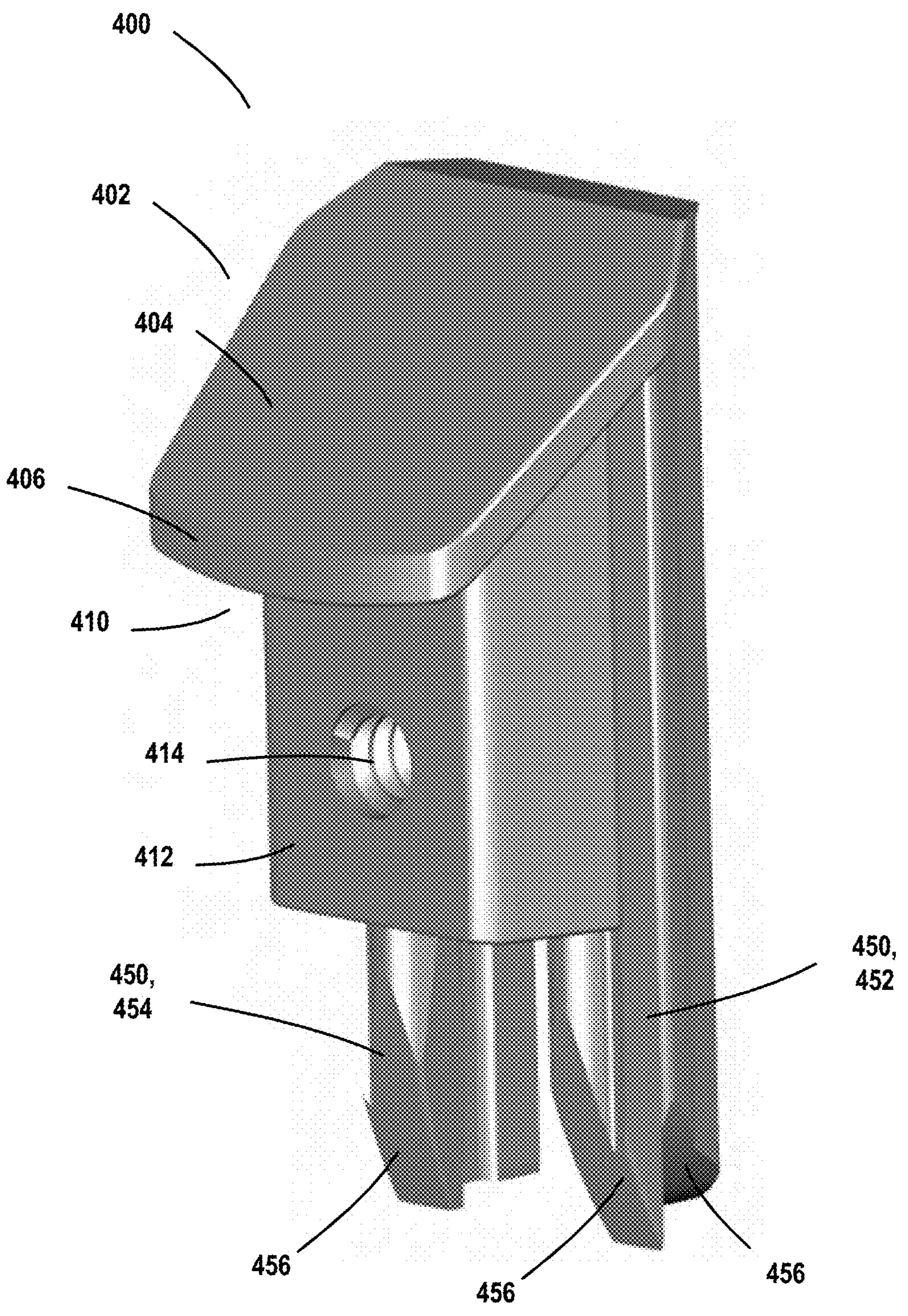

FIG. 11A is a perspective front view of the release lock, in accordance with embodiments of the present disclosure.

FIG. 11B is a perspective rear view of the release lock, in accordance with embodiments of the present disclosure.

FIG. 11C is a perspective bottom view of the release lock, in accordance with embodiments of the present disclosure.

FIG. 11D is a top view of the release lock, in accordance with embodiments of the present disclosure.

FIG. 11E is a bottom view of the release lock, in accordance with embodiments of the present disclosure.

Figure 11G:
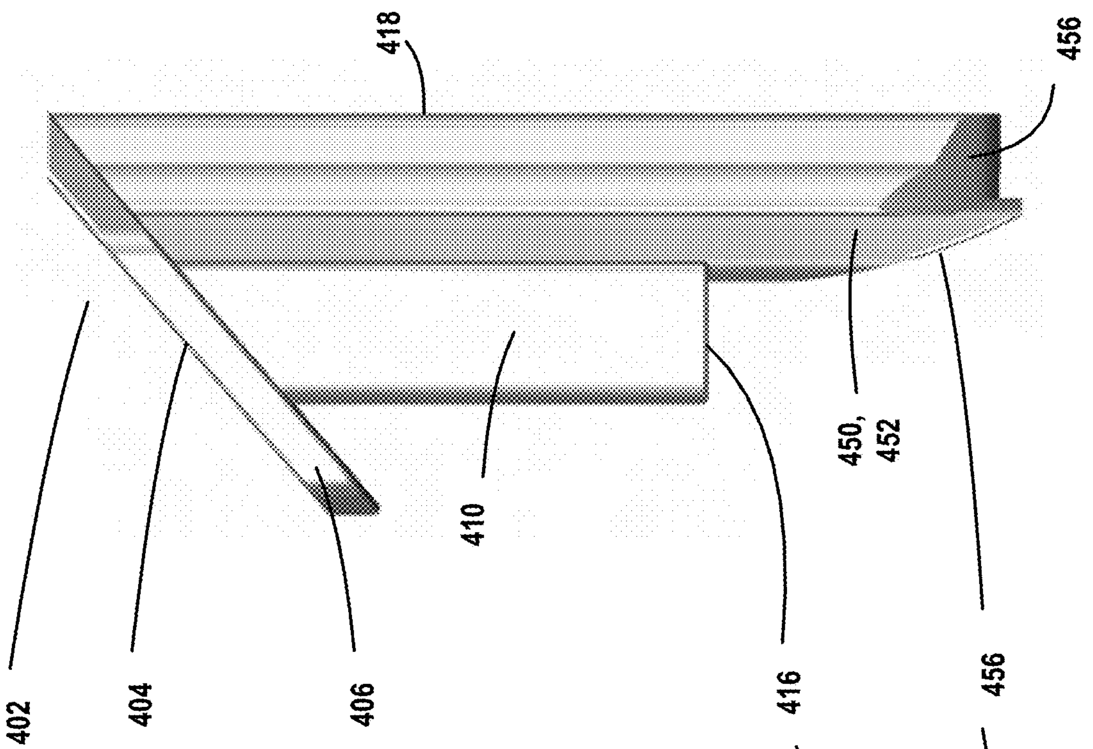
Figure 11F:
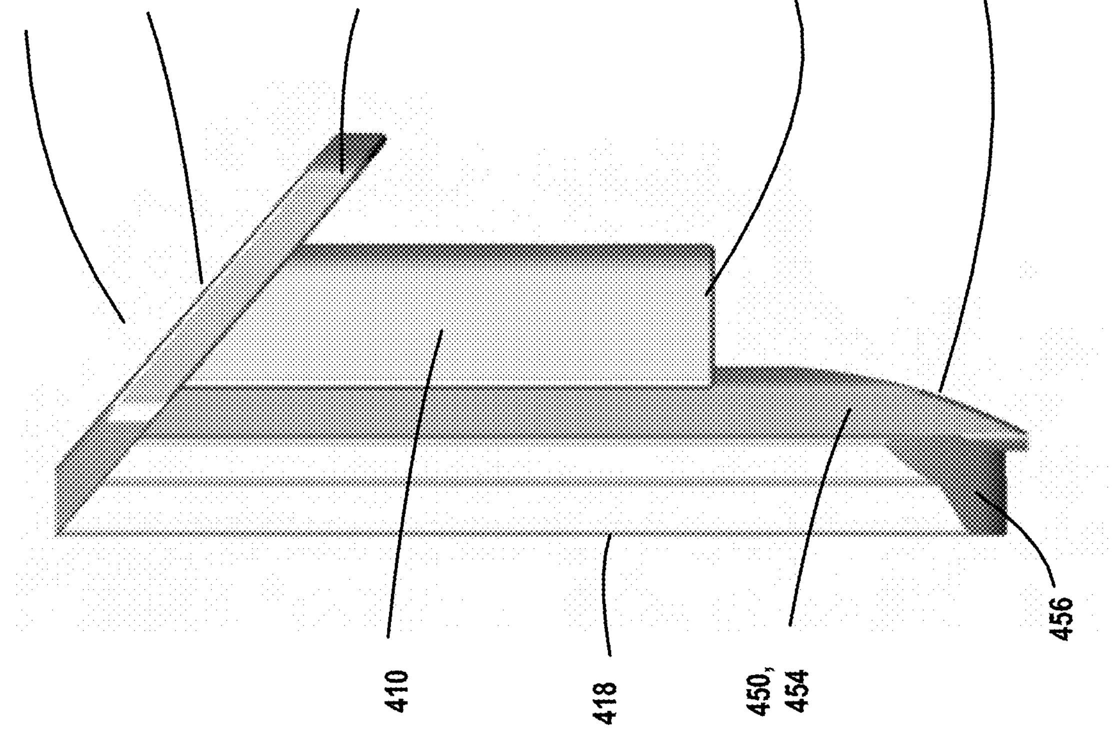

FIG. 11F is a first side view of the release lock, in accordance with embodiments of the present disclosure.

FIG. 11G is a second side view of the release lock, in accordance with embodiments of the present disclosure.

Figure 11I:
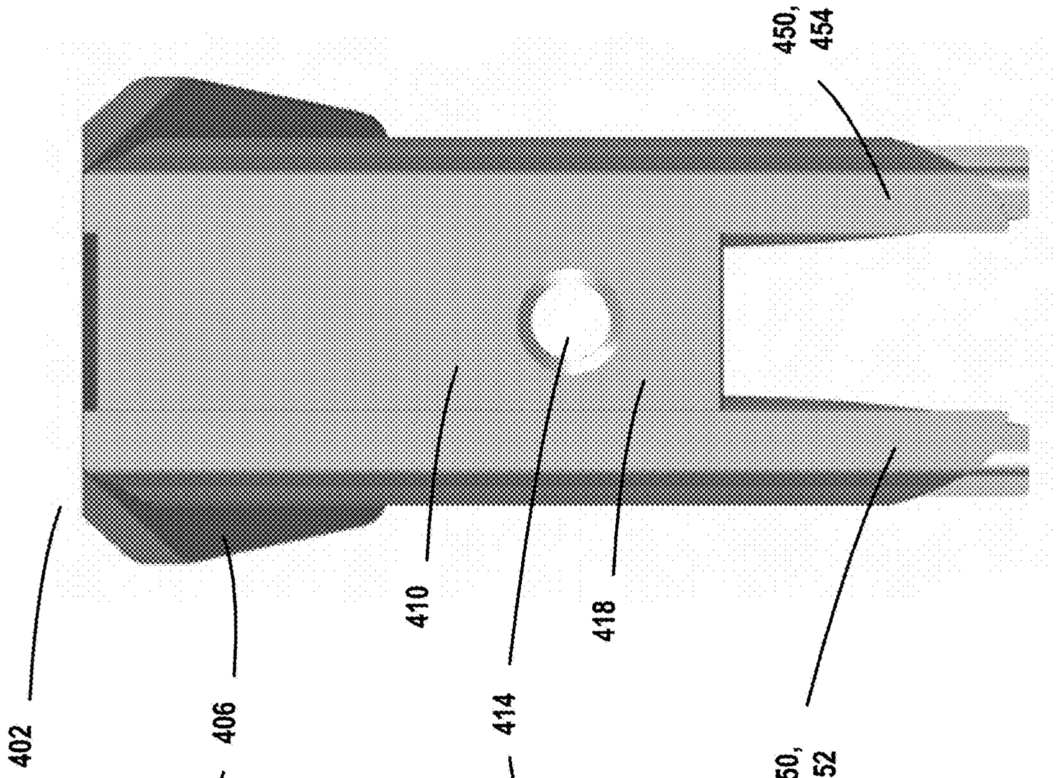
Figure 11H:
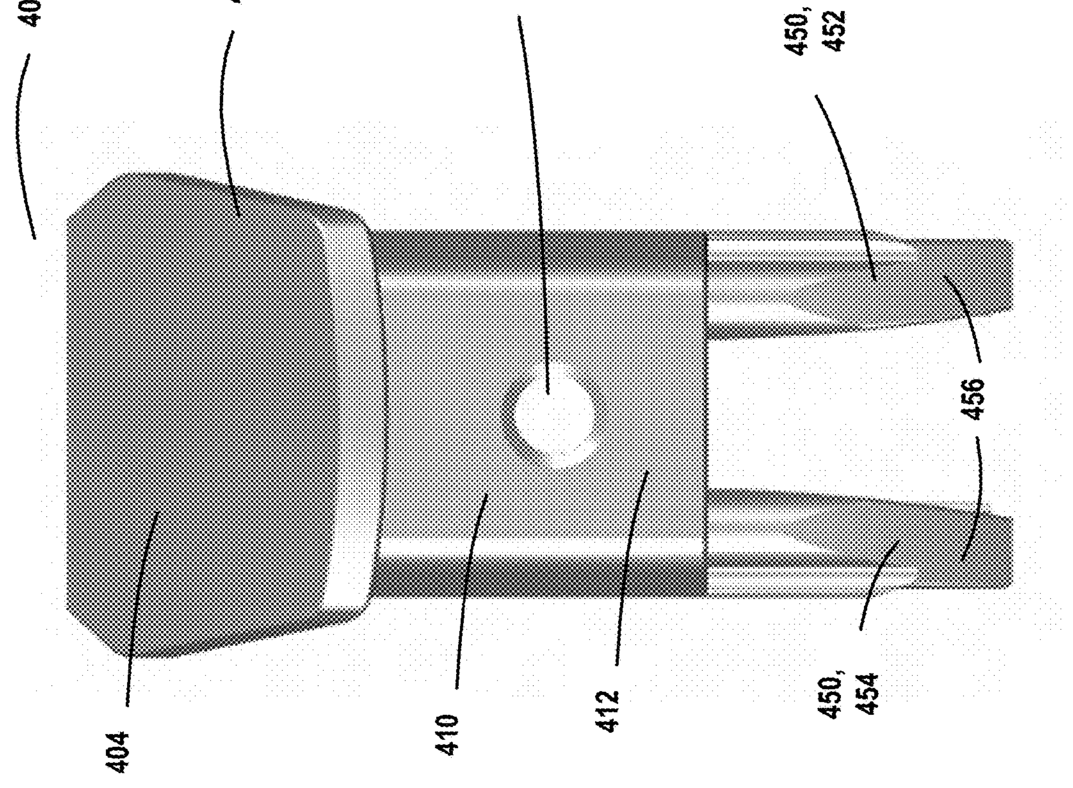

FIG. 11H is a front view of the release lock, in accordance with embodiments of the present disclosure.

FIG. 11I is a rear view of the release lock, in accordance with embodiments of the present disclosure.

FIG. 12A is an enlarged perspective front view of a portion of the release stop with the release lock engaged, in accordance with embodiments of the present disclosure.

FIG. 12B is a cross-sectional A-A perspective view of the body of the release lock installed in the release stop of FIG. 12A, in accordance with embodiments of the present disclosure.

FIG. 12C is a cross-sectional B-B perspective view of the projections of the release lock installed in the release stop of FIG. 12A, in accordance with embodiments of the present disclosure.

FIG. 12D is a cross-sectional C-C perspective view of the release stop of FIG. 12A at a location below the release lock, in accordance with embodiments of the present disclosure.

FIG. 13A is an enlarged perspective front view of a portion of the release stop with the release lock engaged, in accordance with embodiments of the present disclosure.

FIG. 13B is a cross-sectional D-D perspective view of the release lock of FIG. 13A, in accordance with embodiments of the present disclosure.

Figure 13C:
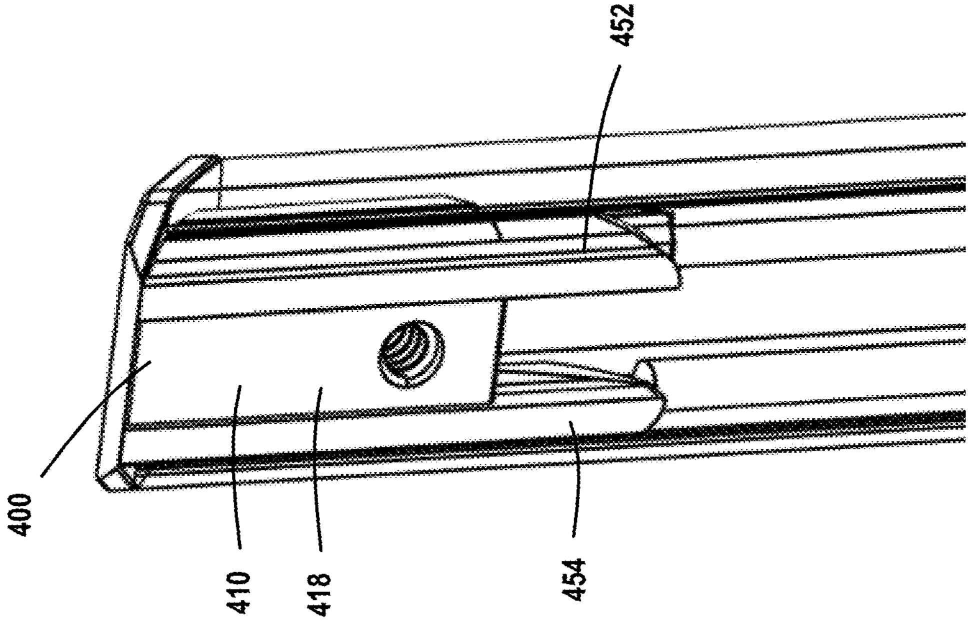

FIG. 13C is an enlarged perspective rear view of a portion of the release lock installed in the cover, in accordance with embodiments of the present disclosure.

Figure 14B:
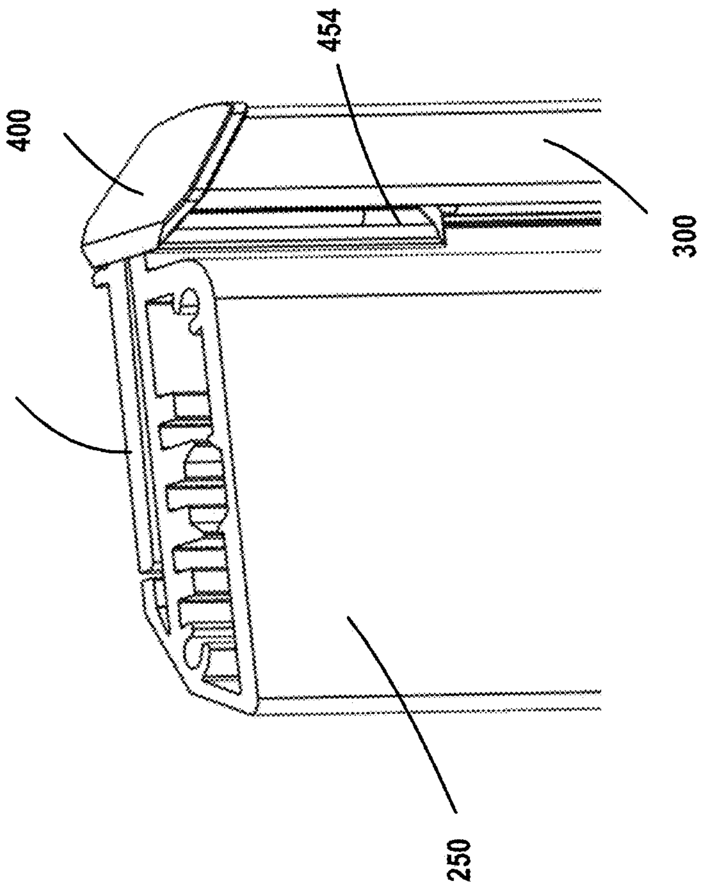
Figure 14A:
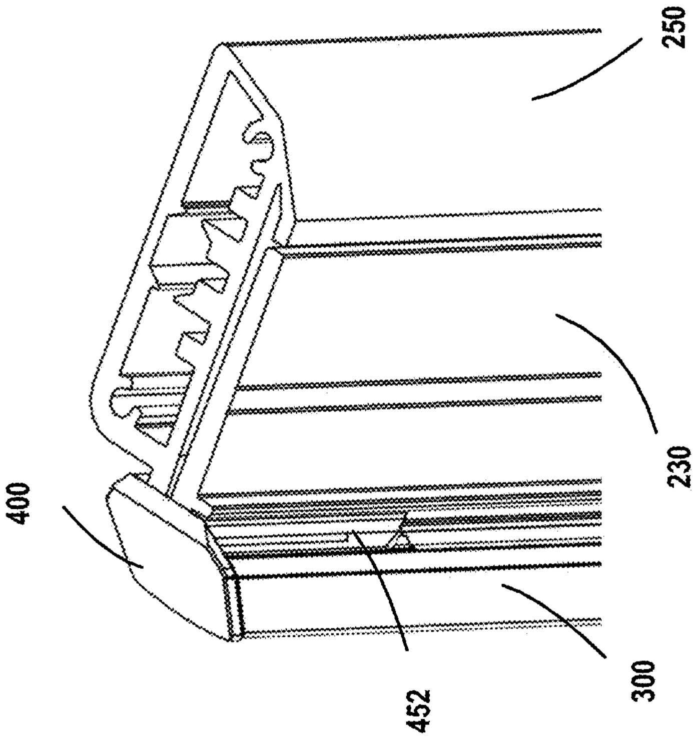

FIG. 14A is an enlarged perspective side view of a portion of the release stop with the release lock installed, in accordance with embodiments of the present disclosure.

FIG. 14B is an enlarged perspective side view of a portion of the release stop with the release lock installed, in accordance with embodiments of the present disclosure.

FIG. 15A is a perspective front view of a release lock, in accordance with embodiments of the present disclosure.

FIG. 15B is a perspective bottom view of the release lock of FIG. 15A, in accordance with embodiments of the present disclosure.

FIG. 15C is a bottom view of the release lock of FIG. 15A, in accordance with embodiments of the present disclosure.

Figure 16B:
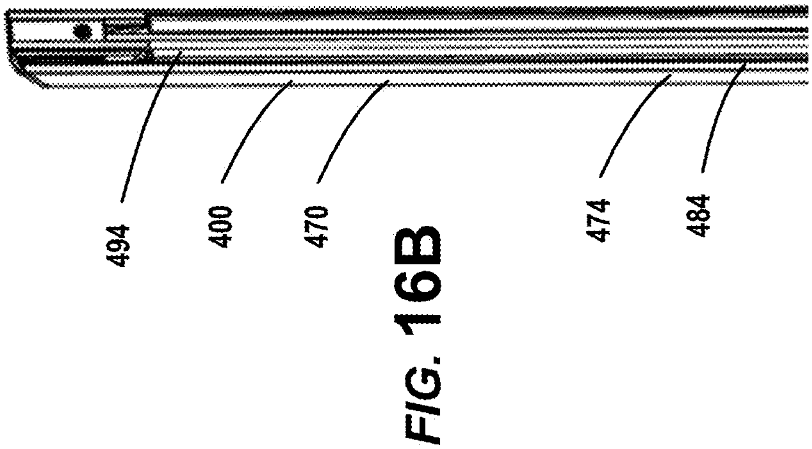
Figure 16A:
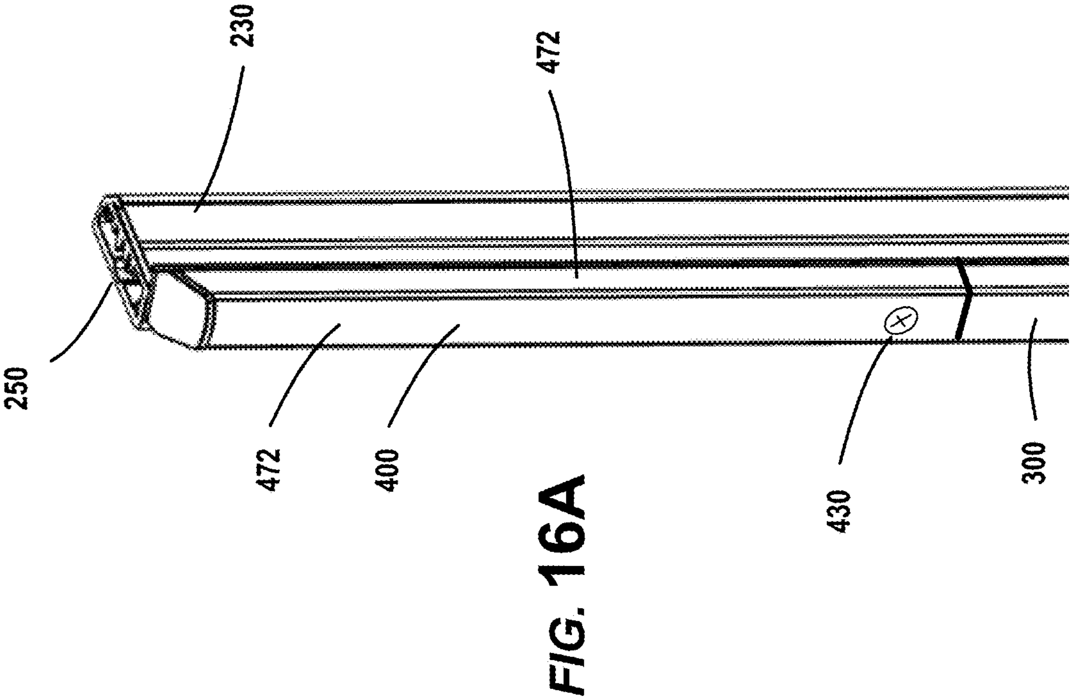

FIG. 16A is a perspective front view of a release stop with a release lock having a lock cover, in accordance with embodiments of the present disclosure.

FIG. 16B is a perspective rear view of the release lock of FIG. 16A, in accordance with embodiments of the present disclosure.

Figure 16D:
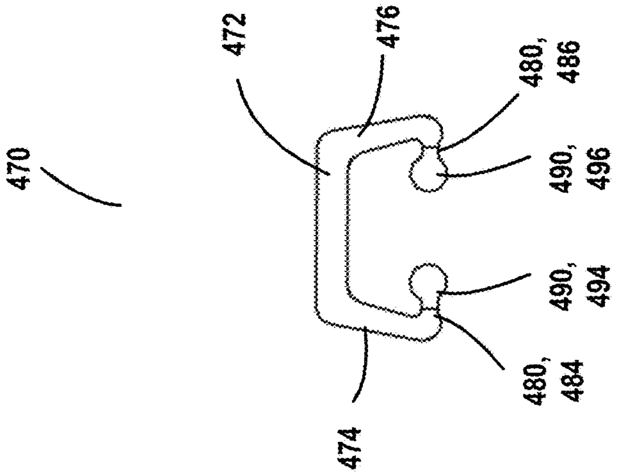
Figure 16C:
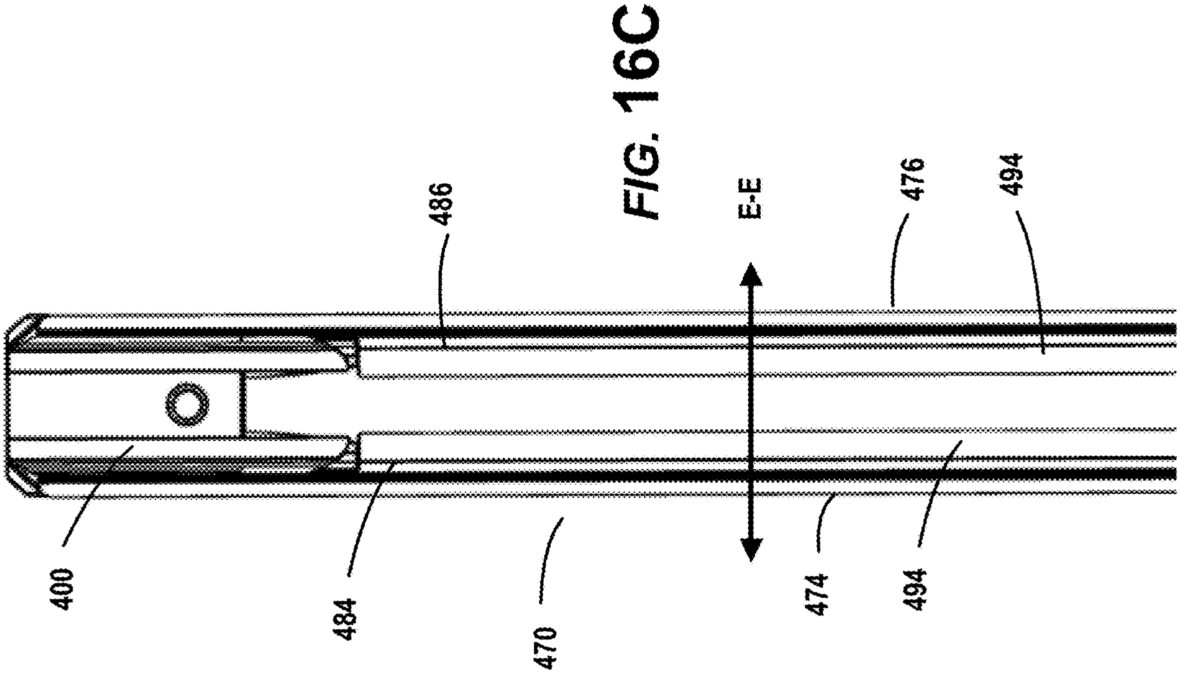

FIG. 16C is a rear view of the release lock of FIG. 16A, in accordance with embodiments of the present disclosure.

FIG. 16D is a cross-sectional E-E view of the lock cover of the release lock of FIG. 16C, in accordance with embodiments of the present disclosure.

Figure 17B:
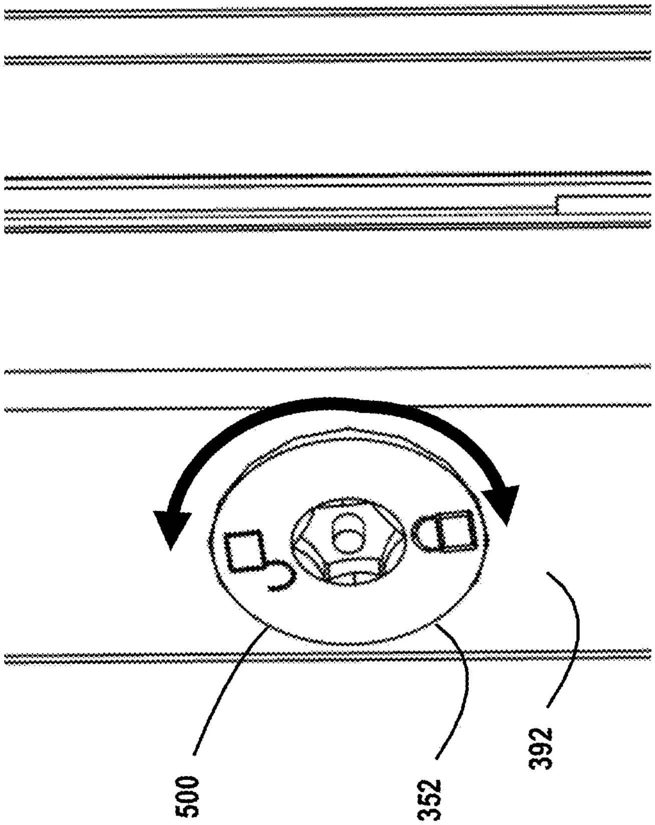
Figure 17A:
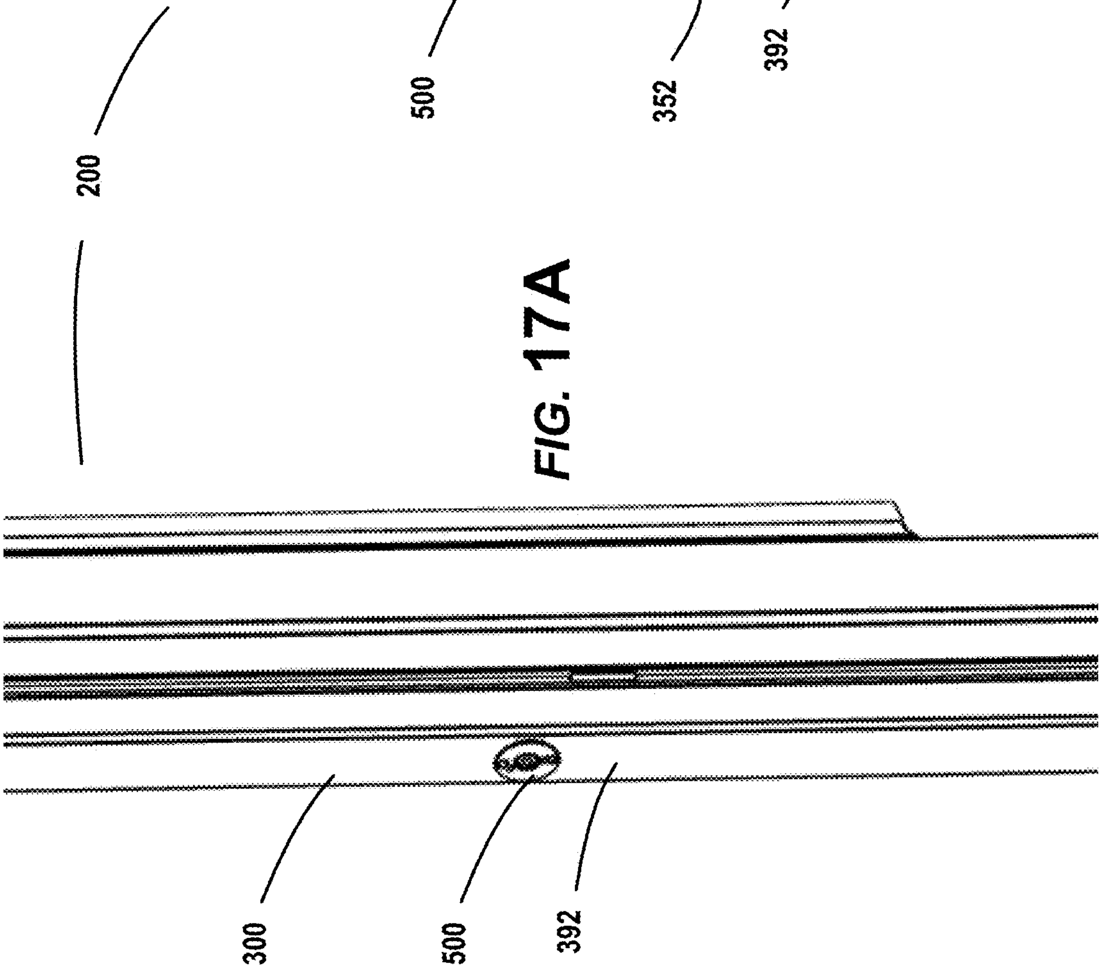

FIG. 17A is a perspective view of a portion of a release stop for an anti-obstruction door system that utilizes a cover lock assembly, in accordance with embodiments of the present disclosure.

FIG. 17B illustrates an enlarged view of cover lock assembly of FIG. 17A, in accordance with embodiments of the present disclosure.

FIG. 18A illustrates a perspective side view of the cover lock assembly installed with the cover removed, in accordance with embodiments of the present disclosure.

FIG. 18B illustrates a perspective side view of the cover lock assembly installed with the cover removed, in accordance with embodiments of the present disclosure.

Figure 19B:
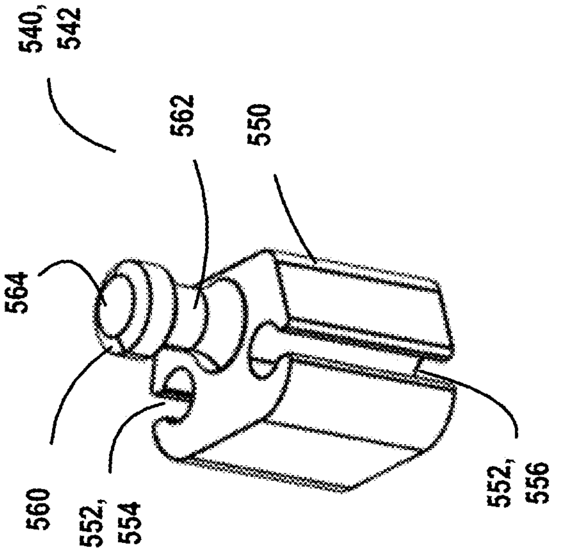
Figure 19C:
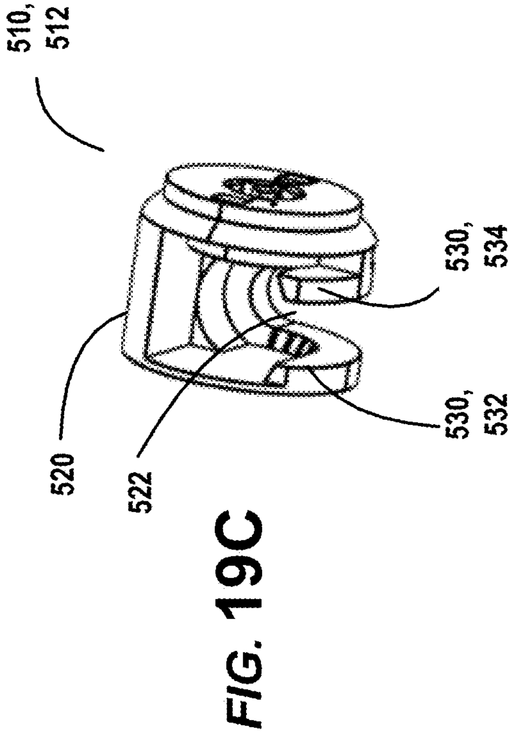
Figure 19A:
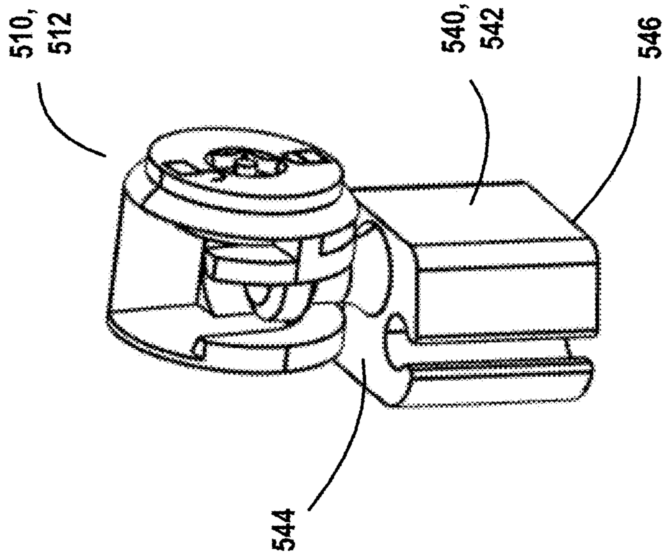

FIG. 19A illustrates a perspective side view of the cover lock assembly, in accordance with embodiments of the present disclosure.

FIG. 19B illustrates a perspective side view of the cover lock bearing of the cover lock assembly, in accordance with embodiments of the present disclosure.

FIG. 19C illustrates a perspective side view of the cover lock of the cover lock assembly, in accordance with embodiments of the present disclosure.

Figure 20A:
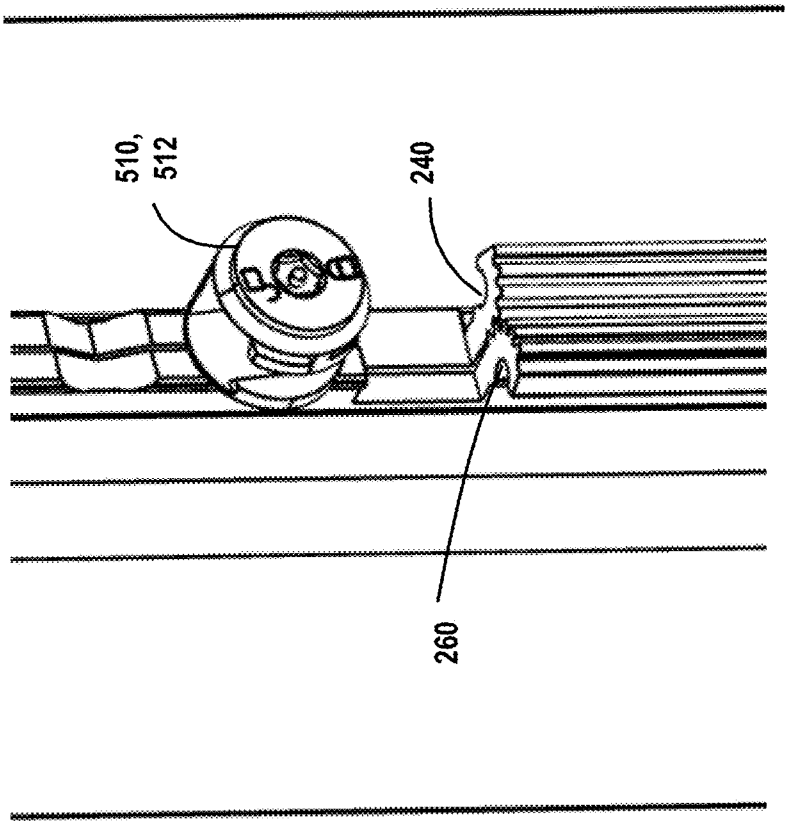

FIG. 20A illustrates a perspective top view of the cover lock assembly with the cover and the cover lock bearing removed, in accordance with embodiments of the present disclosure.

Figure 20B:
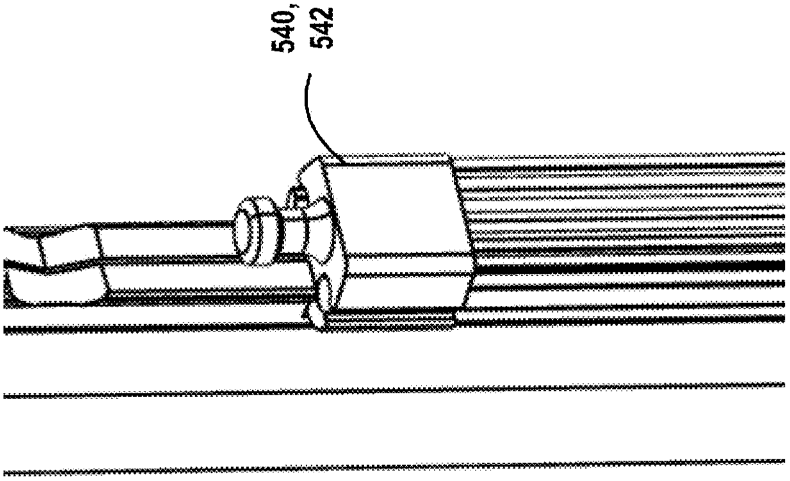

FIG. 20B illustrates a perspective top view of the cover lock assembly with the cover and the cam lock removed, in accordance with embodiments of the present disclosure.

Figures 21A, 21B, 21C:
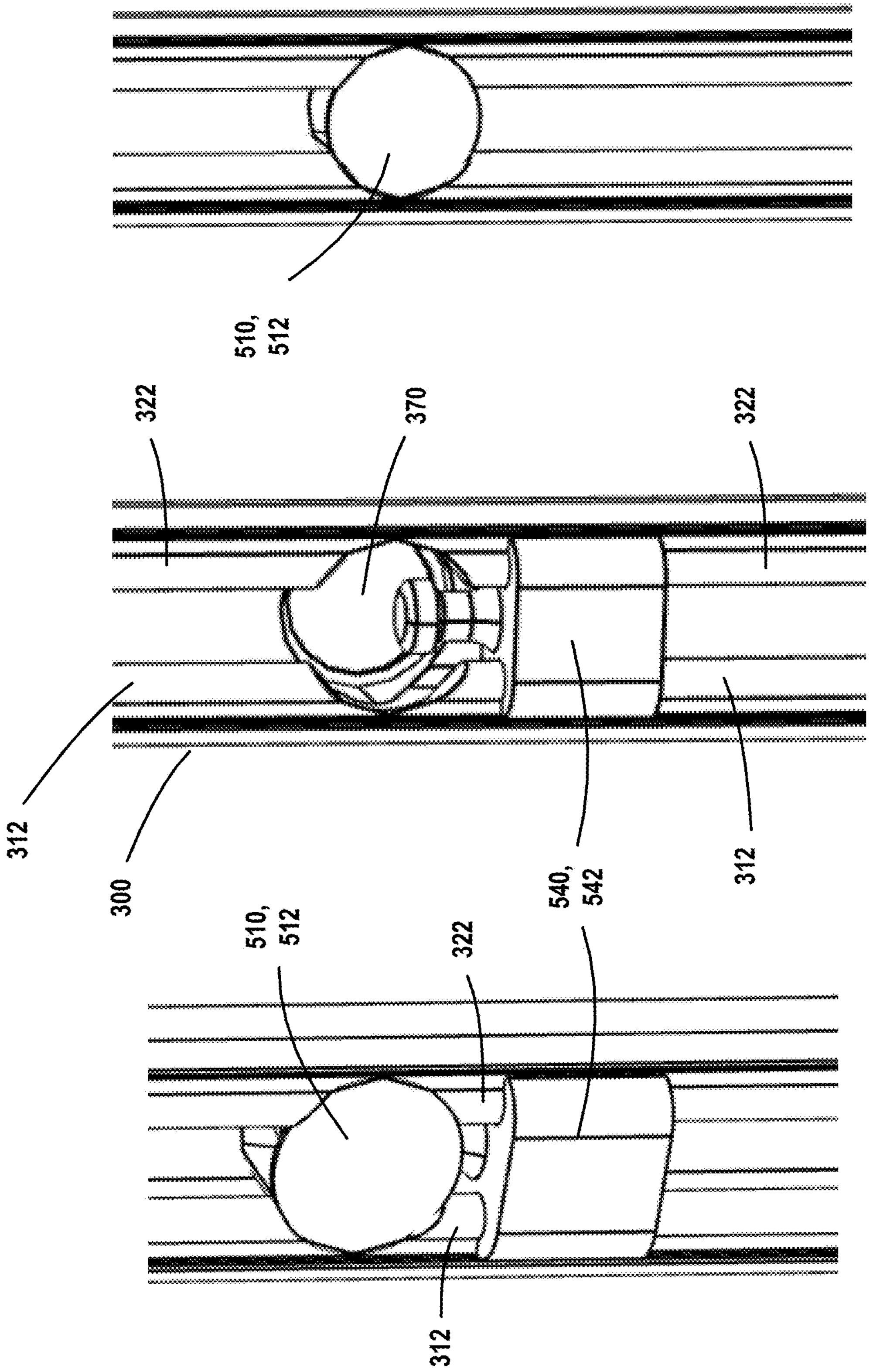

FIG. 21A illustrates a perspective rear view of the cover lock assembly installed with the first release portion (support member) and the second release portion (stop member) removed, in accordance with embodiments of the present disclosure.

FIG. 21B illustrates a perspective rear view of the cover lock assembly installed with the first release portion (support member), the second release portion (stop member), and the cam lock removed, in accordance with embodiments of the present disclosure.

FIG. 21C illustrates a perspective rear view of the cover lock assembly installed with the first release portion (support member), the second release portion (stop member), the cam lock and cover lock bearing, in accordance with embodiments of the present disclosure.

FIG. 22 is a method of manufacturing, installing, and operating the anti-obstruction door system, in accordance with embodiments of the present disclosure.

DETAILED DESCRIPTION

The following detailed description teaches specific example embodiments of the invention; however, other embodiments of the invention do not depart from the scope of the present invention. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including" when used herein, specify the presence of stated features, steps, operations, elements, and/or components, but do not preclude the presence or addition of one or more other features, steps, operations, elements, components, and/or groups thereof.

Referring now to the drawings, wherein like reference numerals designate corresponding or similar elements throughout the several views, embodiments of an anti-obstruction system 100 are illustrated in FIGS. 1 through 21C. An anti-obstruction system 100 is utilized to improve safety and mitigate risk in the event a barrier 10 (e.g., door, or the like) providing egress into a structure (e.g., building, room, or the like) become obstructed by objects or a person. In particular embodiments, the anti-obstruction system 100 may be utilized in medical, behavioral health, and/or assisted living environments, such as in rooms (e.g., patient, resident, or the like rooms), bathrooms (e.g., patient, resident, or the like bathrooms), cross corridor bathrooms (e.g., patient, resident, or the like cross corridor bathrooms). The anti-obstruction systems 100 of the present disclosure provides improved efficient solutions to access someone in the event a barrier 10 is obstructed and not able to open (e.g., not able to open inwardly). That is, in an emergency the barrier 10 is able to swing in the opposite direction from the normal operation in order to minimize potential risks to people located on the opposite side of an obstructed barrier 10.

As will be discussed in further detail herein, the anti-obstruction system 100 utilizes a hinge 110 (e.g., a double swing hinge 112), a release stop 200 (otherwise described herein as an emergency release stop), and/or handle and lock hardware. The hinge 110 is operatively coupled to a frame and/or a wall, and to an edge of a barrier 10 (e.g., a door), while the release stop 200 is operatively coupled to an opposing frame and/or an opposing wall. The release stop 200, as will be described in further detail herein, acts as the stop for the barrier 10 so that the barrier 10 can only swing in one direction (e.g., into a room). However, when the barrier 10 is required to swing in an opposite direction (e.g., outwardly from a room) the release stop 200 may be disengaged through the use of the release lock 400 to allow the barrier 10 to swing in another direction (e.g., outwardly from a room).

The anti-obstruction system 100 as installed is illustrated in FIG. 1, while FIG. 2 illustrates an anti-obstruction system 100 with an obstructed barrier 10, in accordance with some embodiments of the present disclosure. As illustrated in FIG. 1, the hinge 110 of the anti-obstruction system 100 may be a continuous hinge (e.g., extending along a portion of, the majority of, or the entire length of the barrier edge of the barrier 10 and/or the barrier frame 20), and is operatively coupled to the barrier 10 and the barrier frame 20 for pivotal movement of the barrier 10 relative to the barrier frame 20 between a closed position and one or more open positions (e.g., including a fully open position). It should be understood that while the hinge 110 is illustrated and described as a double swing hinge having knuckles and one or more pins, it should be understood that other types of hinges 110 (e.g., geared hinges, double action hinges, or other like hinges) may be used that are allowed to swing in both directions when the release stop 200 is disengaged, as will be described herein.

As illustrated in FIGS. 1 and 2, the barrier 10 may be a door that is operatively coupled to a barrier frame 20, such as a door frame, which is operatively coupled to a wall (e.g., an opening in a wall). The barrier frame 20 may comprise three (3) portions including an upper portion 24 disposed adjacent an upper end (e.g., header) of a barrier opening, and two side portions 26, 28 disposed along either edge of the barrier opening, with one side portion 26 being on the hinge side of the barrier 10, and the opposite side portion 28 being on the latch side of the barrier 10. The barrier frame portions 24, 26, 28 may be secured to each other and/or an adjoining structure by frame connectors (e.g., clips, tabs, fasteners, or the like).

The barrier 10 may be hung within the door opening by the hinge 110, such as through hinge connectors 130. The connectors 130 may comprise fasteners that secure the hinge 110 through hinge apertures in a first portion 114 to a barrier frame 20 (e.g., to one or more hinge reinforcements in the barrier frame 20) and/or a wall. The connectors 130 may secure a second portion 116 of the hinge 110 to the barrier 10 (e.g., to a side edge that may or may not have hinge reinforcements in the door 10). Other types of hinge connectors 130, such as welds, non-removeable fasteners, or the like may be used to operatively couple the hinge 110 to the barrier 10 and/or barrier frame 20. It should be understood that the barrier 10 and barrier frame 20 may be any type of conventional door and door frame of any size and shape, and made of any type of material (e.g., wood, metal hollow, metal with a core, plastic, composite, or the like, or combinations thereof).

As illustrated, in FIGS. 3A and 3B, instead of using a traditional stop located in the barrier frame 20, the anti-obstruction system 100 of the present invention utilizes a release stop 200, which when engaged only allows the barrier 10 to swing in one direction (e.g., inwardly or outwardly). Alternatively, when the release stop 200 is disengage the barrier 10 is able to swing in two directions (e.g., inwardly and outwardly).

FIGS. 4 through 5B illustrate one embodiment of the hinge 110, in which it is a double swing hinge 112 having a first portion 114 that is configured for operative coupling with a barrier frame 20 or a wall, and a second portion 116 that is configured for operative coupling with a barrier 10. However, in other embodiments the hinge 110 may be geared hinges (e.g., interlocking teeth, or the like), double action hinges, or other types of double swing hinges. As illustrated in FIG. 5B, the second hinge portion 116 swings with respect to the first hinge portion 114 (e.g., at an angle of 100 degrees, or the like) to allow the barrier 10 to swing in either direction when not prevented by the release stop 200 or an obstruction to the barrier 10.

FIGS. 6 through 9B illustrates a release stop 200 (otherwise described as an emergency stop, an emergency release stop, or the like). As illustrated in FIGS. 6 through 7B the release stop comprises a first release portion 230 (otherwise described as a support member, a frame support member, or the like) and a second release portion 250 (otherwise described as a stop member, swing stop member, or the like), a cover 300, and a release lock 400, as will be described in further detail herein. When in the locked position the release stop 200 acts as a frame stop that prevents a barrier 100 from swinging past the release stop 200. However, when there is a need for the barrier 100 to swing past the release stop 230, such as when an inwardly swinging door is obstructed, a release lock 400 is moved from an engaged position (as illustrated in FIG. 8A) to a disengaged position (as illustrated in FIG. 8B) in order allow the release stop 200 to move (e.g., rotate, as illustrated in FIG. 7B) such that the barrier 10 is able to swing in both directions (e.g., outwardly and inwardly). While the release lock 400 is illustrated as moving in a generally vertical direction, it should be understood that in some embodiments the release lock 400 may be rotated into and/or out of engagement and/or disengagement, moved horizontally into and/or out of engagement, or the like. As such, it should be understood that the release lock 400 may be engaged and/or disengaged by moving vertically, horizontally, rotating, or the like, or combinations thereof in order to prevent or allow the release stop 200 from moving. As such, as illustrated in FIGS. 3A, 3B, and 6 through 9B, the support member 230 may be operatively coupled to a barrier frame 20 (or wall), while the stop member 250 acts as a frame stop when in the engaged position (e.g. locked position), and swings with respect to the support member 230 when in the disengaged position (e.g., unlocked position).

It should be understood that the stop member 250 may be able to rotate with respect to the support member 230 through any hinge connection. However, as illustrated in FIGS. 9A and 9B, the support member 230 and the stop member 250 may each have teeth 270 that interlock with each other to allow the stop member 250 to swing with respect to the support member 230 when the release lock 400 is disengaged from the locked position. The support member 230 and the stop member 250 may each be described as having leaves, such as a first leaf 232 (otherwise described as a support leaf) and a second leaf 252 (otherwise described as a stop leaf). The first leaf 232 may be described has having a first webs 234 (otherwise described as a support web) operatively coupled to a first head 238 (otherwise described as a support head). The second leaf 252 may be described as having a second web 254 (otherwise described as a stop web) operatively coupled to a second head 258 (otherwise described as a stop head). The first web 234 and the second web 254 may be integrally operatively coupled to (e.g., formed integrally with) the first head 238 and the second head 258, respectively. Alternatively, the first web 234 and the second web 254 may be formed separately from the first head 238 and the second head 258, and thereafter, operatively coupled to the first head 238 and the second head 258 (e.g., connected through fasteners, welds, or the like).

The first head 238 and the second head 258 may be continuous and extend along the entire length of the related webs 234, 254, or the heads 238, 258 may be discontinuous (e.g., have one or more slots between separate head portions) and be located only over a portion of the related webs 234, 254. For example, hinge slots (not illustrated) may be formed (e.g., milled, or the like) in the heads 238, 258 and one or more bearings (e.g., plastic, metal, composite, or other like bearings—not illustrated) may be operatively coupled to the heads 238, 258 at the locations of the hinge slots (e.g., the slots receive the bearings) The bearings keep adjacent leaves from sliding past each other. The heads 238, 258 may comprise gear teeth 270, extending therefrom (e.g., from substantially arcuate portion of each head 238, 258). The gear teeth 270 may be radial, helical, or other shaped gear teeth, and may extend around at least a portion of the heads 238, 258 (e.g., the arcuate portion for a distance adequate for the gear teeth to mesh throughout the range of motion of the release stop 200, or the like).

FIG. 9C further illustrates that a portion of the heads 238, 258 of the leaves 232, 252 may be notched with respect to the webs 234, 254 in order to allow for the engagement and disengagement of the release lock 400. As such, the leaves 232, 252 of the release lock 200 may be longer than the heads 238, 258. The notched heads 238, 258 may allow for the lock body 410 to be extended into, and covered by, the cover 300 when the release lock 400 is installed.

FIGS. 10A through 10D illustrate a cover 300, which is operatively coupled to the support member 230 and the stop member 250, such as the heads 238, 258 of the two leaves 232, 252, as will be described in further detail herein. The cover 300 may be generally C-shaped with a cover web 302, cover flanges (e.g., a first cover flange 304 and a second cover flange 306), and returns at each end 310, 320 (e.g., a first return 310 and a second return 320) of the cover flanges 304, 306. The end of the flanges 304, 306 and/or the returns 310, 320 may include pivot portions 312, 322 (e.g., a first pivot portion 312 and a second pivot portion 322) that act as pivot features (e.g., that are generally circular in cross-section, or having another shape). The pivot portions 312, 322 are received by the heads 238, 258 of the leaves 232, 252. As such, the heads 238, 258 may have hook portions 240, 260 (e.g., a first hook portion 240 and a second hook portion 260) that are used to receive the pivot portions 312, 322 of the of the cover 300. Each leaf 232, 252 pivots with respect to the pivot portion 312, 322 and/or the pivot portions 312, 322 pivot with respect to each leaf 232, 252, while the gear teeth 270 mesh centrally between the pivot portions 312, 322. The hook portions 240, 260 of the heads 238, 258 truncate abruptly at hook ends 242, 262, which in this embodiment are flat surfaces (however, the hook ends 242, 262 may have a surface of any shape). The hook ends 242, 262, in some embodiments, are truncated in order to permit the closing of the hinge release stop 200, when they are received in pockets 330, 340 in the cover 300, as shown in FIGS. 12C and 12D. While the pivot portions 312, 322 are illustrated as generally circular in cross-section, the pivot portions 312, 322 can be any shape with which a portion of the leaves 232, 252 (e.g., the hook portions 240, 260, or other feature, may pivot).

The release stop 200 may be assembled by meshing the gear teeth 270, such as first head teeth 272 (e.g., support head teeth) with second head teeth 274 (e.g., stop head teeth) together in proper alignment, which may be most easily done in the position of FIG. 12C. This corresponds to the position when the release stop 200 is in an engaged position (e.g., locked) with the webs 234, 254 in or near contact with each other, and then the cover 300 may be slid over the heads 238, 258 of the leaves 232, 252. FIGS. 10B through 10D and FIG. 13B illustrate that a portion of the returns 310, 320, and/or the pivot portions 312, 322 thereof, of the cover 300 may be notched with respect to cover flanges 304, 306 in order to allow for the release lock 400 to fit within the cover 300. As will be described with respect to FIGS. 12A through 12D, it should be understood that the notched portions of the returns 310, 320 and/or the pivot portions 312, 322 may be greater than the notched portion of the heads 238, 258 of the support member 230 and stop member 250. That is, when the cover 300 is assembled to the support member 230 and the stop member 250, the notched portions of the returns 310, 320, and/or the pivot portions 312, 322, may be located below the notched portion of the heads 238, 258 in order to allow for at least a portion of the projections 450 of the release lock 400 to be received within the hook portions 240, 260 of the heads 238, 258. Said differently, portions of the returns 310, 320, and/or the pivot portions 312, 322, are not located within at least a portion of the hook portions 240,

260 of the heads 238, 258 in order to allow the hook portions 240, 260 to receive a portion of the projections 450.

As illustrated in FIGS. 10A through 10D in some embodiments the cover 300 may have a cover aperture 350 (e.g., a circular hole, a hole of a different shape, a slotted hole, or the like) that extends through at least a portion of the cover 300. In some embodiments, as illustrated in the figures, the cover aperture 350 may be located in the cover web 302. However, it should be understood that in some embodiments, the cover aperture 350 may be located in one of the cover flanges 304, 306. As will be discussed in further detail herein, the cover release aperture 350 may receive a release connector 430 that may be used to secure the release lock 400 in place when the release lock 400 is engaged. It should be understood that the cover release aperture 350 may be located in the web 302, in the first flange 304, in the second flange 306, or the like such that the release connector 430 extends through the cover 300 and into the release lock 400. Alternatively, the release connector 430 may extend through the release lock 400 (e.g., through the rear surface 418) and into the cover 300 (e.g., fully or partially). In other embodiments, the release connector 430 may be a weld or other type of connector.

As illustrated in FIGS. 11A through 11I, the release lock 400 may comprise, a head 402, a body 410 operatively coupled to the head 402, and one or more projections 450 (e.g., legs, or the like) operatively coupled to the body 410 (e.g., extending from the body 410, or the like). It should be understood that the head 402 may have an upper surface 404 that is exposed. The upper surface 404 of the head 402 may be sloped (e.g., downwardly toward the floor when installed on the upper portion of the release stop 200) to provide an anti-ligature feature and/or for aesthetics. In some embodiments, as illustrated in FIGS. 11A through 11I the head 402 may include a lock flange 406 that extends past the lock body 410 of the release lock 400. The lock flange 406 may be used in order to mate with and/or be flush to the outer surface of at least a portion of the cover 300 (e.g., an upper end 390 of the cover 300 that may be sloped or may not be slope). As such, the lock flange 406 may restrict further movement of the lock body 410 within the cover 300. Moreover, at least a portion of the outer surface, or the entire outer surface, of the lock flange 406 may have the same shape as the outer surface of the cover 300 (e.g., the outer surface of the web 302 and flanges 304, 306 of the cover 300).

The lock body 410 may have an outer surface 412 that fits within and/or mates with at least a portion of the inner surface of the cover 300. The lock body 410 may further have a base surface 416 that may mate with a portion of the cover 300 and/or the release stop 200 (e.g., release stop heads 238, 258, or the like). The lock body 410 may further comprise a rear surface 418 that may mate with a portion of the release stop 200 (e.g., the support member 230 and/or the stop member 250, or the like). As such, as will be described in further detail herein, the lock body 410 may act as a plug within at least a portion of the cover 300. Moreover, the release lock 400, such as the lock body 410 may include a lock aperture 414 (e.g., that may or may not have threads) and may receive a release connector 430 that may extend through the cover 300 (e.g., through a cover aperture 350) and/or into the release lock 400 in order to prevent movement of the release lock 400 when the release connector 430 is engaged, as will be described in further detail herein. The lock aperture 414 is illustrated as being in the front surface of lock body 410, however, it should be understood that the lock aperture 414 may be located in any portion of the release lock 400 (e.g., in the lock flange 406, lock top 402, sides of the lock body 410, or the like) and may restrict movement of the release lock 400 with respect to the cover 300, another portion of the release stop 200 (e.g., first release stop portion 230, second release stop portion 250, or the like) and/or a portion of the frame 20, or other like component operatively coupled to frame, wall, or the like.

The release lock 400 may further comprise one or more projections 450, such that when the release lock 400 is installed, the one or more projections 450 aid in restricting the movement of the release stop 200. For example, when the release lock 400 is installed, the support member 230 and/or the second release portion 250 are restricted from moving with respect to each other and/or with respect to the cover 300. For example, the one or more projections 450 may comprise a first release projection 452 (otherwise described as a first projection, a support release projection, or the like) and a second release projection 454 (otherwise described as a second projection, a stop release projection, or the like). As will be described in further detail herein, the first release projection 452 may be utilized to restrict the movement between the cover 300 and the support member 230 of the release stop 200, while the second release projection 454 may be utilized to restrict the movement between the cover 300 and the stop member 250. In some embodiments, the one or more projections 450 may have a converging surface 456 to aid in guiding the one or more projections 450 into place within the cover 300 and/or the support member 230 and/or the stop member 250.

FIGS. 12A through 12D illustrate an upper end of the release stop 200 and different cross sections of different portions of the release lock 400 as installed in the engaged position within the cover 300 of the release stop 200. For example, FIG. 12B illustrates a cross-sectional view along the A-A cross-section of FIG. 12A, FIG. 12C illustrates a cross-sectional view along the B-B cross-section of FIG. 12A, and FIG. 12D illustrates a cross-sectional view along the C-C cross-section of FIG. 12A. As illustrated in FIG. 12B, the lock body 410 of the release lock is located within the web 302 and flanges 304, 306 of the cover 300. As such, in some embodiments at least a portion of the outer surface 412, the majority of the outer surface 412, or the entirety of the outer surface 412 of the lock body 410 may conform to the inner surfaces of the web 302 and flanges 304, 306 of the cover 300. As illustrated in FIG. 12C, heads 238, 258 of the first portion 230 and the second portion 250 of the release stop 200 are not notched in this location. As such, the one or more projections 450 of the release lock 400 may be located within and/or between the hooks 240, 260 of the heads 238, 258, a portion of the leaves 232, 252 of the first portion 230 and the second portion 250 of the release stop 200, and/or a portion of the cover 300 in order to restrict the movement of the stop member 250 with respect to the support member 230 and/or the cover 300 of the release stop 200. Returning to FIG. 12D, illustrating a cross-sectional view of the release stop 200 at a location below the release lock 400, this figure illustrates that the cover returns 310, 320 and the pivot features 312, 322 are not notched at this location. As such, hooks 240, 260 of the heads 238, 258 receive the returns 310, 320 and/or the pivot portions 312, 322 of the cover 300, which allow the stop member 250 to rotate with respect to the support member 230 and/or the cover 300 when the release lock 400 is disengaged.

FIGS. 13A through 13C illustrate a perspective view of the release lock 400 installed within the cover 300, a vertical cross-sectional view of the release lock 400 of FIG. 13A, and a rear view of the release lock 400 installed within the cover 300. As illustrated in FIGS. 13B and 13C, at least a portion of the first lock projection 452 and the second lock projection 452 are located within the hooks 240, 260 of the heads 238, 258 of the support member 230 and the stop member 250, and above the returns 310, 320 and/or the pivot portions 312, 322 of the cover 300.

Moreover, FIGS. 14A and 14B illustrate enlarged right and left perspective views of the release lock 400 installed in the cover 300 of the release stop 200. As illustrated in FIGS. 14A and 14B, at least a portion of the first lock projection 452 and the second lock projection 454 may be located outside of the cover 300, and between the cover 300 (e.g., the flanges 304, 306 and/or the returns 310, 320) and a portion of the first leaf 232 and the second leaf 252, respectively. As such, the first projection 452 and/or the second projection 454 aids in restricting movement between the support member 230, the stop member 250, and the cover 300 of the release stop 200.

FIGS. 15A through 15C illustrate alternate embodiments of a release lock 400. As illustrated, the release lock 400 comprises a third projection 456, which in some embodiments is a front projection 458 (otherwise described as head projection, a tooth projection, or the like) that is configured to aid in restricting the movement of the heads 238, 258 of the support member 230 and the stop member 250. In alternate embodiments, the front projection 458 may be the only projection 450 of the release lock 400. As illustrated in FIGS. 15B and 15C, in some embodiments when the front projection 458 is a tooth projection, it has teeth locks 460 that extend from the tooth projection and are configured to slide within one or more the teeth 270 of the heads 238, 258. As such, the teeth locks 460 may comprise one or more support teeth locks 462 (e.g., a plurality of support teeth locks 462) that have a profile to engage with one or more of the support head teeth 272 of the support head 238. The teeth locks 460 may further comprise one or more stop teeth locks 464 (e.g., a plurality of stop teeth locks 464) that have a profile to engage with one or more of the stop head teeth 274 of the second head 258. Since the one or more support head teeth 272 and the one or more stop head teeth 274 interact with each other, and thus have different profiles, the one or more support teeth locks 462 and the one or more stop teeth locks 274 may also have different profiles. When the release lock 400 is engaged, the third projection 456, such as the front projection 458 with the teeth locks 460 aids in restricting the movement of the first head 238 of the support member 230 and the second head of the stop member 250 from moving with respect to each other (e.g., preventing the support head teeth 272 and the stop head teeth 274 from moving with respect to each other).

FIGS. 16A through 16D illustrate another alternate embodiment of a release lock 400 that includes a cover extension 470 that is configured to be operatively coupled to the cover 300 (e.g., butts up to, overlaps with, interlocks with, or the like). The cover extension 470 may be operatively coupled with (e.g., formed integral with the release lock 400), or may be detachable from the release lock 400 (e.g., coupled through the use of a connector, such as a fastener, weld, or the like). The cover extension 470 may have an extension web 472, a first extension flange 474, a second extension flange 476, and extension returns 480 (e.g., a first extension return 484 and a second extension return 486) at each end of the extension flanges 474, 476. Moreover, the ends of the extension flanges 474, 476 and/or the returns 480 may include a portion that acts as an extension pivot portion 490 (e.g., first extension pivot 494, second extension pivot 496). The extension pivot portions 490 may have generally circular cross-sections, but in other embodiments may have a different shape. The extension pivot portions 490 may be received by the heads 238, 258 of the support member 230 and/or stop member 250 of the release stop 200. As such, the cover extension 470 may have the same shape and configuration as the cover 300. The cover extension 470 of this embodiment of the release lock 400 allows a user to easily access the release lock 400 for engagement or disengagement of the release lock 400. That is, a user standing on the ground may be able to disengage the connector 430, and then disengage the release lock 400 by sliding the cover extension 470 which slides the one or more projections 450 out of the locked position. As such, the cover extension 470 may provide improved access to release lock 400 for engagement and disengagement.

Regardless of the configuration of the release lock 400, the release connector 430 may be any type of connector, such as a fastener (e.g., screw, bolt, pin, shaft, lever, or the like), clip, clamp, or other like mechanical connector. The release connector 430 may be removeable from the cover 300 or may be operatively coupled to the cover 300 such that it cannot be completely removed from the cover 300, and thus, cannot be removed and lost. In other embodiments, the release connector 430 may be a weld that permanently operatively couples the release lock 400 and the cover 300. In some embodiments, the release connector 430 illustrated in FIG. 16A may be a part of a cover lock assembly 500 as described below.

FIGS. 17A through 21C illustrates embodiments of a cover lock assembly 500 that allows for the locking and unlocking of the cover 300 such that the cover 300 may slide to allow for the engagement and disengagement of the release lock 400 to which the cover 300 is operatively coupled. As illustrated in FIG. 17A the cover lock assembly 500 may be located generally around the mid-point 392 of the release stop 200. However, it should be understood that the cover lock assembly 500 may be located anywhere along the length of the cover 300, such as adjacent the upper end 390 (as installed) of the cover 300, adjacent the lower end 394 of the cover 300, or anywhere in-between the upper end 390 and the lower end 394. As illustrated in FIG. 17B the cover lock assembly 500 may be locked or unlocked through the use of a tool (e.g., specialty tool, Allen wrench, key, screwdriver, square tool, hexagon tool, torx tool, socket, pin head tool, or the like) that is able to rotate at least a portion of the cover lock assembly 500 clockwise or counterclockwise to lock and unlock cover lock assembly 500 (e.g., restrict the cover 300 from sliding or allow the cover 300 to slide). While the cover lock assembly 500 may be rotated through the use of a tool, in other embodiments a tool may be used to release a member (e.g., lever, or the like) that may be moved (e.g., flipped, pulled, rotated, or the like) in order to unlock or lock the cover lock assembly 300.

As illustrated in FIGS. 18A through 19C, in some embodiments the cover lock assembly 500 may comprise a cover lock 510 and a cover lock member 540. As illustrated, the cover lock 510 may be a cam lock 512 that rotates between the locked position and the unlocked position. Moreover, the cover lock member 540 may comprise a cover lock bearing 542 having a bearing body 550 and a cover lock projection 560. FIGS. 18A and 18B illustrate the cover lock assembly 500 installed in a locked position with the cover removed 300.

FIGS. 19A through 19C illustrate the cover lock assembly 500 removed from the release stop 200. As illustrated in FIG. 19B, the bearing body 550 may have a shape similar to or the same as the release lock body 410 (e.g., the outer surface 412 thereof) such that the bearing body 550 may conform to the inner surfaces of the web 302 and flanges 304, 306 of the cover 300. The bearing body 550 may have an upper bearing surface 544 and a lower bearing surface 546 to aid in supporting the bearing body 550 within the release stop 200. For example, as illustrated in FIGS. 20A and 20B, the heads 238, 258 and/or the hook portions 240, 260 thereof (e.g., a first hook portion 240 and a second hook portion 260) are notched in the location in which the cover lock assembly 500 is installed. As such, the bearing body 550 may be located within the notched portion such that the movement of the bearing body 550 is restricted (e.g., the upper bearing surface 544 and the lower bearing surface 546 restrict the movement of the bearing body 550 within the notched heads 238, 258 and/or restrict the movement of the heads 238, 258 with respect to each other). The bearing body 550 may be slotted such that the bearing body 550 forms one or more bearing apertures 552 (e.g., a first bearing aperture 554 and a second bearing aperture 556). The one or more bearing apertures 552 are configured to receive the returns 310, 320 and/or pivot portions 312, 322 of the cover 300 to aid in allowing them to slide within the bearing apertures 552 as the cover 300 slides. FIG. 19B further illustrates a cover lock projection 560 operatively coupled to the bearing body 550. The cover lock projection 560 may comprise a cover lock shaft 562 and a cover lock flange 564 extending past the outer surface of the cover lock shaft 562. The cover lock projection 560 may be engaged and disengaged by the cam lock 512 to allow for the locking and the unlocking.

FIG. 19C illustrates that the cam lock 512 may have a cam lock body 520 which may be circular to allow for the cam lock 512 to rotate when installed. The cam lock body 520 may be slotted such that the cam lock body 520 forms a cam lock aperture 522 that is configured to receive the cover lock projection 560. Moreover, the cam lock body 520 may include cam ribs 530 (e.g., a first cam rib 532 and a second cam rib 534) configured to engage with the cover lock flange 564 when the cam lock 512 is in the locked position. Alternatively, when the cam lock 512 is in the unlocked position, the cam ribs 530 may move past the cover lock projection 560 (e.g., past the cover lock flange 564) such that the cam lock 512 may move with the cover 300 when the cover 300 is slid. As such, when the cover 300 is slid the cover lock projection 560 of the cover lock member 540 is removed from the cam lock aperture 522 of the cam lock 512.

As previously discussed, FIGS. 20A and 20B illustrate the cam lock 512 and the cover lock bearing 542 with the cover removed. Moreover, FIGS. 21A through 21C illustrate the cover lock assembly 500 located in the cover 300 with the support member 230 and the stop member 250 removed. As illustrated in FIGS. 21A through 21C, the cover 300 may have a cover lock aperture 370 extending through a portion of the cover 300, such as the cover web 302. The cover lock aperture 370 may have a shape that is the same as the outer surface of the cam lock 512 to receive the cam lock 512 and allow it to rotate within the cover lock aperture 370. As illustrated in FIG. 21B, in some embodiments, the cover lock projection 560 of the cover lock bearing 542 is positioned such that it is located within the cover lock aperture 370 of the cover 300. As such, the cam lock 512 can rotate around the cover lock projection 560 for locking and unlocking, as previously discussed herein.

It should be understood that in other embodiments of the invention, the cover lock assembly 500 may have a different configuration that allows for the locking and unlocking of the cover 300 such that the cover 300 and release lock 400 can be slid to disengage the release lock 400 and allow the release member 250 of release stop 200 to swing. In some embodiments the cover lock assembly 500 may include a lever that may be pulled to allow for the disengagement. In other embodiments, the cover lock assembly 500 may be a lever that is rotated to allow for the disengagement. In still other embodiments, the cover lock assembly 500 may include a screw that prevents movement of the cover 300, and when disengaged, the cover 300 is able to slide.

It should be further understood that in some embodiments the release lock 400 may be operatively coupled at any location within the cover 300 (e.g., integrally or removably) such that the release lock 400 and the cover 300 may be slid upwardly in order to disengage the one or more projections 450 and allow the stop member 250 of the release stop 200 to swing such that the barrier 10 can be opened in either direction. For example, one or more cover lock assemblies 500 in the cover 300 (e.g., that keep the cover in place) may be disengaged (e.g., loosened, removed, or the like) such that the cover 300 and the operatively coupled release lock 400 may slide upwardly into a location at which the heads 238, 258 are notched, and thus allowing the stop member 250 to move with respect to the support member 230 and/or the cover 300. For example, the release lock 400 may be located in the middle 392 of the cover 300, near the bottom end 394 of the cover 300, or at any other location along the cover 300, and operate in the same or similar way as described herein such that the release lock 400 may be engaged and/or disengaged to lock or unlock the release stop 200.

FIG. 22 illustrates a process 600 of manufacturing, installing, and operating the anti-obstruction door system 100. As illustrated in block 602 of FIG. 22, the release stop 200 members 230, 250, such as the leaves 232, 252 and/or the cover 300 are formed. For example, the leaves 232, 252 with the notched heads 238, 258 and/or the cover 300 with the notched returns 310, 320, pivot portions 312, 322, a cover release aperture 350, and/or a cover lock aperture 352 are formed when forming the leaves 232,252 and the cover 300, or formed in standard leaves 232, 252 and/or covers 300 that are already formed (e.g., by notching the heads 238, 258 and/or returns 310, 320 of preformed leaves 232, 252 and/or covers 300). The materials used for the release stop 200 may include, for example, various materials such as aluminum, steel, stainless steel, plastic resin, composite (e.g., plastic resin over-molded onto a substrate of different material, or other like composites), or the like, or combinations thereof.

Block 604 of FIG. 22 further illustrates that the release lock 400 may be manufactured. For example, release lock 400 may be cast, machined, or the like, or combinations thereof. In particular embodiments, the release lock 400 may be cast, which may reduce the costs associated with creating the release lock 400.

Block 606 of FIG. 22 further illustrates that the support member 230 (e.g., first leaf 232) is operatively coupled to the stop member 250 (e.g., second leaf 252) through the use of the cover 300. For example, the heads 238, 258 are interlocked together (e.g., interlocking the teeth 270

Block 608 of FIG. 22 further illustrates that the release lock 400 and/or the cover lock assembly 500 are operatively coupled to the cover 300, the support member 230 and/or the stop member 250. For example, the release lock 400 is operatively coupled to the cover 300 (e.g., using a connector, such as a fastener, weld, or the like). Additionally, or alternatively, the bearing body 550 may be located within the notched portion of the support member 230 and/or the stop member 250 such that the movement of the bearing body 550 is restricted (e.g., the upper bearing surface 544 and the lower bearing surface 546 restrict the movement of the bearing body 550 within the notched heads 238, 258 and/or restrict the movement of the heads 238, 258 with respect to each other). The cam lock 512 may be at least partially coupled to the cover lock projection 560, such that the cover 300 may be installed (e.g., slide over the cam lock 512). In other embodiments, at least a portion of the cam lock 512 may be installed to the cover 300 before the cover is installed. In still other embodiments, the cam lock 512 may be installed after the cover 300 is installed. As further illustrated in block 608, the support member 230 (e.g., first leaf 232) is operatively coupled to the stop member 250 (e.g., second leaf 252) through the use of the cover 300. For example, the cover 300 is slid over at least a portion of the heads 238, 258. When assembled, the one or more projections 450 of the release lock 400 and/or the locking and unlocking of the cam lock 512 with respect to the covert lock projection 560 restrict the movement between the support member 230, the stop member 250, and/or the cover 300. During assembly, the movement of the cover 300 may be restricted from sliding with respect to the heads 238, 258 through the use of the cover lock assembly 500.

FIG. 22 further illustrates in block 610 that the components of the anti-obstruction system 100 may be shipped separately, at least partially pre-assembled, or assembled (e.g., as described with respect to the release stop 200 discussed in block 606). While the release stop 200 may be sent as assembled, alternatively, in some embodiments the release stop 200 may be sent at least partially unassembled to be assembled on site based on the door being a right-hand swinging, left-hand swinging, inward swinging, and/or outward swinging door 10. Moreover, the hinge 110 and/or a barrier handle (not specifically discussed herein) may be sent unassembled, partially assembled, or the like.

Block 612 of FIG. 22 further illustrates that an installer operatively couples the hinge 110 to the frame 20 or a wall, and to the edge of the barrier 10 (e.g., door edge, or the like) using connectors 130. The installer further operatively couples the support member 230 (e.g., first leaf 232) of the release stop 200 to the opposite side frame 20 or the wall on the opposite side of the opening in the wall. If the release stop 200 is not pre-assembled, the installer further operatively couples the stop member 250 (e.g., second leaf 252) to the support member 230 (e.g., first leaf 232) through the use of the cover 300, as previously described in block 608. The cover lock assembly 500 is in the unlocked position and the release lock 400 and/or cover 300 are slid up in the disengaged position when the release stop 200 is installed. As such, after installation, the installer engages the release stop 200 by engaging the release lock 400 and/or cover 300 (e.g., sliding them into place) and/or locking the cover lock assembly 500. The installer may further install the handle and/or other barrier components.

FIG. 22 further illustrates in block 614 that the barrier 10 swings in the desired orientation (e.g., inwardly into a room) during normal operation and is prevented from swinging the opposite direction by the engaged release stop 200. Should the barrier 10 become obstructed (e.g., as illustrated in FIG. 2), the cover lock assembly 500 is unlocked such that the cover, and thus the release lock 400, may be disengaged (e.g., slid upwardly, or the like). As such, the stop member 250 of the release stop 200 is able to move (e.g., swing, slide, or the like) with respect to the support member 230 to allow the barrier 10 to swing in the opposite direction past the stop member 250.

The anti-obstruction system 100 of the present disclosure having the release stop 200 with the release lock 400 provides an improved system for installing, accessing, and engaging/disengaging a release stop 200. Traditional anti-obstruction systems require forming apertures (e.g., drilling, or the like) into a frame, wall, or floor (e.g., upper frame, side frame, upper wall, side wall, floor, or the like) and using a lock (e.g., bar, rod, or the like) that extends into the aperture in the frame, wall, or floor in order to engage the release stop and prevent the movement of the stop member. The lock may be accessed by a user through the stop member in order to engage and disengage the stop member. These traditional systems require the installer to form the apertures when installing the anti-obstruction system. During installation the installer may damage the frame, wall, floor, and/or anti-obstruction which requires costly repair and replacement of the frame, wall, floor, and/or anti-obstruction system. The release lock 400 for the release stop 200 of the present disclosure removes the need for an installer to make apertures in the frame, wall, and/or floor, and thus reduces the need for costly rework, reduces the complexity of the components of the release stop (e.g., does not require the mechanical locks located within the stop member that increase costs and require servicing), and/or increases the efficiency of the installation of the anti-obstruction system (e.g., reduces the installation time and complexity).

Furthermore, traditional anti-barricade systems may be more difficult to access and open. The release lock 400 of the release stop 200 of the present disclosure allows for case of access and/or engagement and disengagement of the release lock 400 in order to quickly gain access to any area which may be obstructed.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "top," "bottom," "side," "distal," "proximal," "upper," "lower," "left," "right," "horizontal," "vertical," "upward," "downward", "first", "second", or other like terminology merely describe the configuration shown in the figures. The referenced components may be oriented in an orientation other than that shown in the drawings and the terminology, therefore, should be understood as encompassing such variations unless specified otherwise.

It will be understood that when an element is referred to as "operatively coupled" to another element, the elements can be formed integrally with each other, or may be formed separately and put together. Furthermore, "operatively coupled" can mean the element is directly coupled to the other element, or intervening elements may be present between the elements. Furthermore, "operatively coupled" may mean that the elements are detachable from each other, or that they are permanently operatively coupled together.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A release stop for a barrier, the release stop comprising:
a support member configured to be operatively coupled with a frame or a wall, wherein the support member comprises:
a support web; and
a support head with support teeth, wherein the support head extends from the support web;
a stop member operatively coupled with the support member, wherein the stop member comprises:
a stop web; and
a stop head with stop teeth, wherein the stop head extends from the stop web;
a cover operatively coupled to the support member and the stop member; and
a release lock operatively coupled to the support member, the stop member, or the cover;
wherein with the release lock in a first position the stop member is restricted from moving with respect to the support member, and with the release lock in a second position the stop member is allowed to move with respect to the support member.

2. The release stop of claim 1, wherein the cover extends over at least a portion of the support head and the stop head.

3. The release stop of claim 2, wherein the release lock comprises:
a lock body; and
one or more lock projections extending from the lock body;
wherein the one or more lock projections restrict the cover from moving with respect to the stop member or the support member.

4. The release stop of claim 3, wherein the stop head with the stop teeth and the support head with the support teeth are notched with respect to the stop web and the support web.

5. The release stop of claim 3, wherein the cover comprises:
a cover web;
one or more cover flanges; and
one or more returns extending from the one or more cover flanges;
wherein the one or more returns are notched with respect to the one or more cover flanges, and wherein the stop head or the support head receives the one or more returns.

6. The release stop of claim 5, wherein the release lock is configured to be operatively coupled with the cover through a release connector.

7. The release stop of claim 5, further comprising:
a cover lock assembly, wherein cover lock assembly comprises:
a cover lock; and
a cover lock member;
wherein the cover lock member is operatively coupled with the support member or the stop member;
wherein the cover lock is operatively coupled to the cover;
wherein when locked the cover lock is operatively coupled to the cover lock member to restrict movement of the cover; and
wherein when unlocked the cover lock is separated from the cover lock member such that the cover lock can move with the cover.

8. The release stop of claim 1, wherein the release lock comprises:
a lock body; and
one or more lock projections extending from the lock body,
wherein the one or more lock projections restrict the cover from moving with respect to the stop member or the support member.

9. The release stop of claim 8, wherein the release lock further comprises:
a lock head operatively coupled to the lock body, wherein the lock head has a lock flange that extends over a cover end and is at least partially flush with an outer cover surface.

10. The release stop of claim 8, wherein the release lock further comprises:
a lock cover, wherein the lock cover is operatively coupled to the support member and the stop member and mates with the cover.

11. The release stop of claim 8, wherein the one or more lock projections comprise:
a stop member projection that restricts movement between the stop member and the cover.

12. The release stop of claim 8, wherein the one or more lock projections comprise:
a support member projection that restricts movement between the support member and the cover.

13. The release stop of claim 8, wherein the one or more lock projections comprise:
a tooth projection that restricts movement between the support teeth of the support member and the stop teeth of the stop member, or between the teeth of the support member or the teeth of the stop member and the cover.

14. The release stop of claim 8, further comprising:
a coupling that extends through and operatively couples the cover and the release lock.

15. A release lock for a release stop, the release lock comprising:
a lock body;
one or more lock projections extending from the lock body; and
a lock head operatively coupled to the lock body;
wherein the one or more lock projections restrict a cover of the release stop from moving with respect to a stop member or a support member of the release stop; and
wherein the lock head has a lock flange that extends over a cover end and is at least partially flush with an outer cover surface of the cover of the release stop.

16. The release lock of claim 15, wherein the one or more lock projections comprise:
a stop member projection that restricts movement between the stop member and the cover of the release stop; or
a support member projection that restricts movement between the support member and the cover of the release stop.

17. A method of using an anti-obstruction system for allowing a barrier that swings inwardly to swing outwardly, the anti-obstruction system comprising a double swing hinge operatively coupled adjacent a first edge of the barrier and to a frame or a wall, and a release stop comprising a support member operatively coupled with the frame or the wall, a stop member operatively coupled with the support member, wherein the support member comprises a support web and a support head with support teeth, wherein the support head extends from the support web, wherein the stop member comprises a stop web and a stop head with stop teeth, wherein the stop head extends from the stop web, a cover operatively coupled to the support member and the stop member, and a release lock operatively coupled to the support member, the stop member, or the cover; the method comprising:

disengaging the release lock from a first position in which the stop member is restricted from moving with respect to the support member into a second position that allows the stop member to move with respect to the support member; and swinging to the barrier outwardly past the stop member.

* * * * *